United States Patent
Sim et al.

[19]

[11] Patent Number: 5,805,922
[45] Date of Patent: Sep. 8, 1998

[54] QUEUED SERIAL PERIPHERAL INTERFACE HAVING MULTIPLE QUEUES FOR USE IN A DATA PROCESSING SYSTEM

[75] Inventors: Yah Bin Sim; Carl D. Wiseman; Tushar Patel, all of Austin; Rudolf Bettelheim, Buda; Louis Rodriguez, Jr., Fort Worth, all of Tex.; Rollie M. Fisher, Trenton, Mich.; John R. Scollard, Lake Orion, Mich.; Clare C. Leiby, III, Southfield, Mich.

[73] Assignees: Motorola, Inc., Schaumburg, Ill.; Ford Motor Company, Dearborn, Mich.

[21] Appl. No.: 237,437

[22] Filed: May 2, 1994

[51] Int. Cl.$^6$ .................................................. G06F 13/00
[52] U.S. Cl. ............................ 395/825; 395/872; 395/874
[58] Field of Search ........................................ 395/840, 841, 395/825, 826, 827, 872, 876, 500, 493, 250, 427, 285; 370/276, 463

[56] References Cited

U.S. PATENT DOCUMENTS

| | | | |
|---|---|---|---|
| 4,403,288 | 9/1983 | Christian et al. | 395/825 |
| 4,458,316 | 7/1984 | Fry et al. | 395/825 |
| 4,672,613 | 6/1987 | Foxworthy et al. | 395/872 |
| 4,706,082 | 11/1987 | Miesterfeld et al. | 340/825.5 |
| 4,719,458 | 1/1988 | Miesterfeld et al. | 340/825.5 |
| 4,739,323 | 4/1988 | Miesterfeld et al. | 340/825.5 |
| 4,739,324 | 4/1988 | Miesterfeld et al. | 340/825.5 |
| 4,780,814 | 10/1988 | Hayek | 395/285 |
| 4,816,996 | 3/1989 | Hill et al. | 395/825 |
| 4,958,277 | 9/1990 | Hill et al. | 395/872 |
| 5,023,778 | 6/1991 | Simon, Jr. et al. | 395/500 |
| 5,081,454 | 1/1992 | Campbell, Jr. et al. | 341/141 |
| 5,099,481 | 3/1992 | Miller | 395/493 |
| 5,166,685 | 11/1992 | Campbell, Jr. et al. | 341/141 |
| 5,168,276 | 12/1992 | Huston | 341/141 |
| 5,175,732 | 12/1992 | Hendel et al. | 370/463 |
| 5,214,760 | 5/1993 | Hammond et al. | 395/250 |
| 5,303,227 | 4/1994 | Herold et al. | 370/276 |
| 5,561,826 | 10/1996 | Davies et al. | 395/250 |
| 5,619,687 | 4/1997 | Langan et al. | 395/427 |

OTHER PUBLICATIONS

Weste et al., Principles of CMOS VLSI Design A Systems Perspective, Addison–Wesley Publishing Co., pp. 224–230, Oct. 1985.

Primary Examiner—Parshotam S. Lall
Assistant Examiner—Patrice L. Winder
Attorney, Agent, or Firm—Susan C. Hill

[57] ABSTRACT

Serial communication circuitry (10) having multiple queues (11–14) for use in a data processing system (95). Each queue (11–14) has multiple entries (52). Serial transfers from the multiple queues (11–14) are carried out under the control of global parameters (e.g. 205, 209), per-queue parameters (e.g. 211–212, 214–217), and per-entry parameters (e.g. 350–361). Each queue can be programmed to have a different set of per-queue parameters, and each entry within a queue can be programmed to have a different set of per-entry parameters. In addition, serial communication circuitry (10) can perform serial data transfers in response to the assertion of a trigger signal (30) from a source such as a timer (63) or a central processing unit (61). As a result, data transfers can be more precisely related to a particular timing signal or set of timing signals.

24 Claims, 20 Drawing Sheets

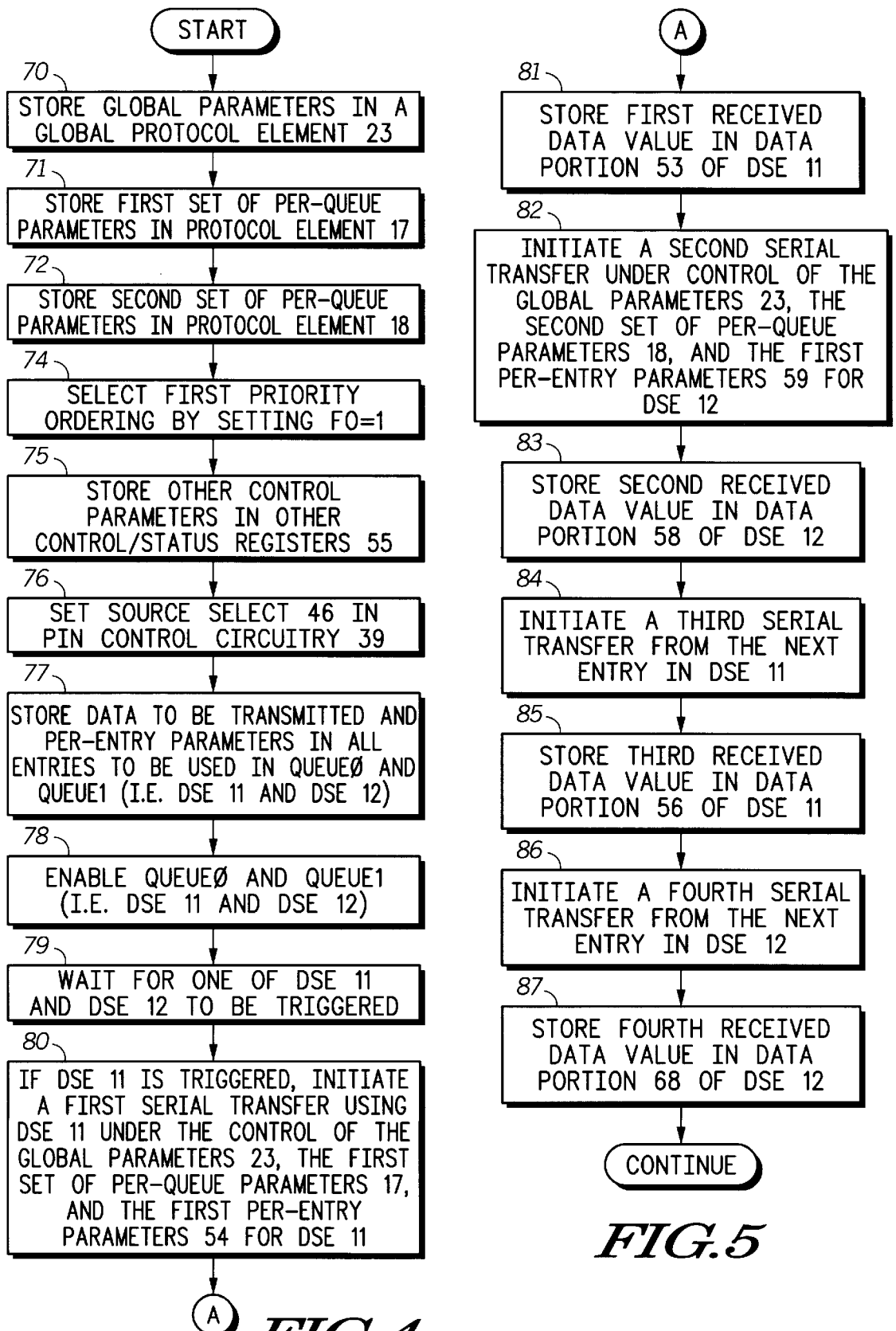

FIG. 8

QSPIM PIN CONFIGURATION REGISTER 274

| BIT NUMBER: | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | | | RESERVED | | | PD0 (SCK) 137 | PD1 (MOSI) 138 | PD2 (MISO) 139 | PD3 (PCS0) 140 | PD4 (PCS1) 141 | PD5 (PCS2) 142 | PD6 (PCS3) 143 | PD7 (PCS4) 144 | PD8 (PCS5) 145 | PD9 (PCS6) 146 | PD10 (PCS7) 147 |
| RESET: | 0 | 0 | 0 | 0 | 0 | 0 | 0 | 0 | 0 | 0 | 0 | 0 | 0 | 0 | 0 | 0 |

| BIT NUMBER: | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| | | | RESERVED | | | DD0 (SCK) 149 | DD1 (MOSI) 150 | DD2 (MISO) 151 | DD3 (PCS0) 152 | DD4 (PCS1) 153 | DD5 (PCS2) 154 | DD6 (PCS3) 155 | DD7 (PCS4) 156 | DD8 (PCS5) 157 | DD9 (PCS6) 158 | DD10 (PCS7) 159 |
| RESET: | 0 | 0 | 0 | 0 | 0 | 0 | 0 | 0 | 0 | 0 | 0 | 0 | 0 | 0 | 0 | 0 |

PD0-10:PORT DATA FIELD
DETERMINES THE ACTUAL INPUT OR OUTPUT VALUE
OF PINS, IF THE PIN IS DEFINED AS
GENERAL-PURPOSE I/O.

DD0-10:DATA DIRECTION FIELD
0-INPUT
1-OUTPUT

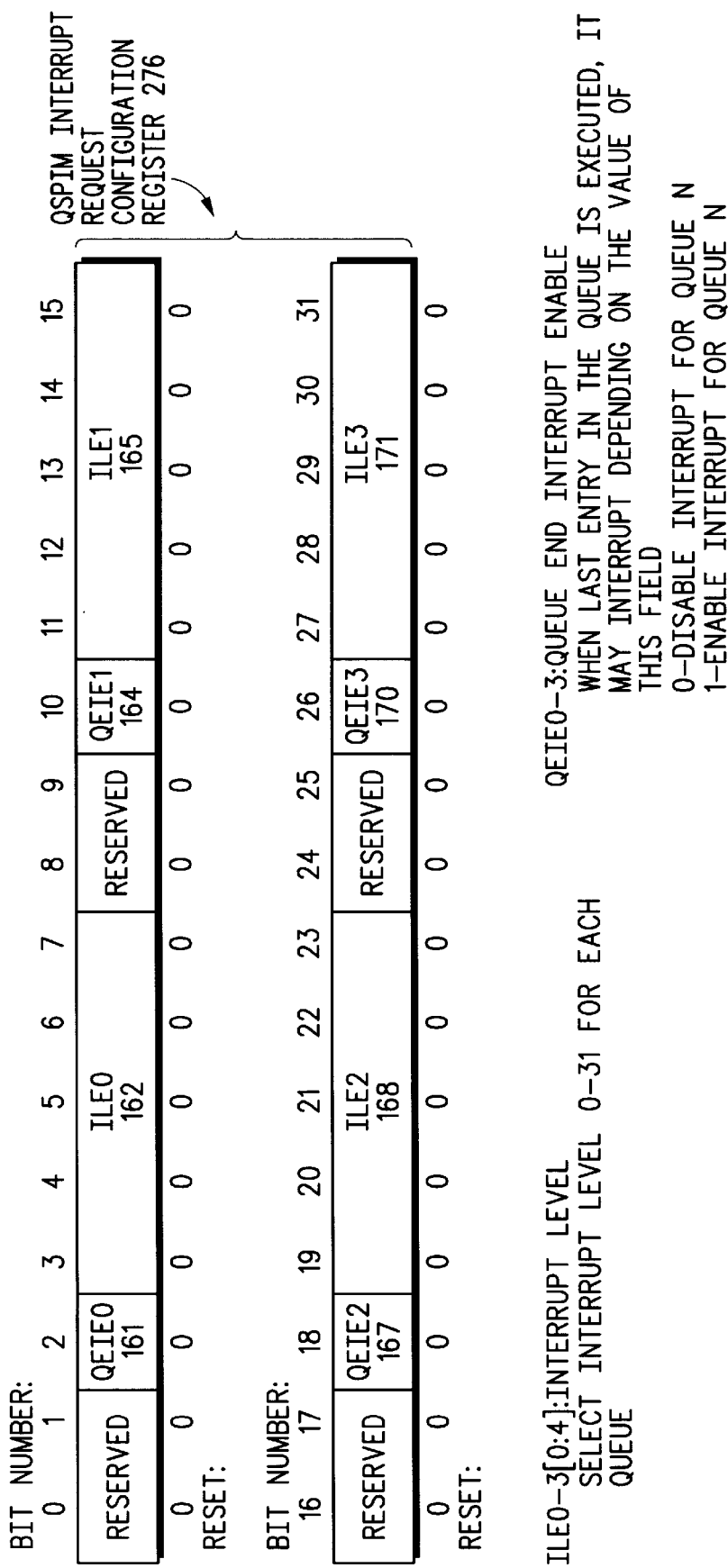

BIT NUMBER:

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| BAUD1 218 | | | | | | | | DSC1 219 | | | | | | | |

RESET:

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|

BIT NUMBER:

| 16 | 17 | 18 | 19 | 20 | 21 | 22 | 23 | 24 | 25 | 26 | 27 | 28 | 29 | 30 | 31 |
|----|----|----|----|----|----|----|----|----|----|----|----|----|----|----|----|
| RESERVED | LSBF1 221 | CPOL1 222 | CPHA1 223 | CDT1 224 | | | | | | | | | | | |

RESET:

| 0 | 0 | 0 | 0 | 0 | 0 | 0 | 0 | 0 | 0 | 0 | 0 | 0 | 0 | 0 | 0 |
|---|---|---|---|---|---|---|---|---|---|---|---|---|---|---|---|

QSPIM COMMUNICATION CONTROL REGISTER (FOR QUEUE 1) 288

BAUD1[0–7]:COEFFICIENT FOR SERIAL CLOCK BAUD RATE
00000000–CORRESPONDS TO VALUE 256
00000001–CORRESPONDS TO VALUE 1
11111111–CORRESPONDS TO VALUE 255

CDT1[0–11]:COEFFICIENT FOR DELAY AFTER TRANSFER
000000000000–CORRESPONDS TO VALUE 4096
000000000001–CORRESPONDS TO VALUE 1
111111111111–CORRESPONDS TO VALUE 4095

DSC1[0–7]:COEFFICIENT FOR DELAY BEFORE SERIAL CLOCK
00000000–CORRESPONDS TO VALUE 0
11111111–CORRESPONDS TO VALUE 255

CPOL1:CLOCK POLARITY
0–INACTIVE STATE OF THE SERIAL CLOCK IS LOGIC 0
1–INACTIVE STATE OF THE SERIAL CLOCK IS LOGIC 1

CPHA1:CLOCK PHASE
0–DATA LATCHED ON THE LEADING EDGE AND CHANGED ON FOLLOWING EDGE OF SERIAL CLOCK
1–DATA CHANGED ON THE LEADING EDGE AND LATCHED ON FOLLOWING EDGE OF SERIAL CLOCK

LSBF1:LEAST SIGNIFICANT BIT FIRST
0–SERIAL TRANSFER BEGINS WITH MOST SIGNIFICANT BIT FIRST
1–SERIAL TRANSFER BEGINS WITH LEAST SIGNIFICANT BIT FIRST

FIG.15

| BIT NUMBER: | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | | | | BAUD2 225 | | | | | | | | DSC2 226 | | | | |
| RESET: | 0 | 0 | 0 | 0 | 0 | 0 | 0 | 0 | 0 | 0 | 0 | 0 | 0 | 0 | 0 | 0 |

| BIT NUMBER: | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| | RESERVED | LSBF2 228 | CPOL2 229 | CPHA2 230 | | | | | | | | CDT2 231 | | | | |
| RESET: | 0 | 0 | 0 | 0 | 0 | 0 | 0 | 0 | 0 | 0 | 0 | 0 | 0 | 0 | 0 | 0 |

QSPIM COMMUNICATION CONTROL REGISTER (FOR QUEUE 2) 290

BAUD2[0-7]: COEFFICIENT FOR SERIAL CLOCK BAUD RATE
00000000—CORRESPONDS TO VALUE 256
00000001—CORRESPONDS TO VALUE 1
⋮
11111111—CORRESPONDS TO VALUE 255

CDT2[0-11]: COEFFICIENT FOR DELAY AFTER TRANSFER
000000000000—CORRESPONDS TO VALUE 4096
000000000001—CORRESPONDS TO VALUE 1
⋮
111111111111—CORRESPONDS TO VALUE 4095

DSC2[0-7]: COEFFICIENT FOR DELAY BEFORE SERIAL CLOCK
00000000—CORRESPONDS TO VALUE 0
⋮
11111111—CORRESPONDS TO VALUE 255

CPOL2: CLOCK POLARITY
0—INACTIVE STATE OF THE SERIAL CLOCK IS LOGIC 0
1—INACTIVE STATE OF THE SERIAL CLOCK IS LOGIC 1

CPHA2: CLOCK PHASE
0—DATA LATCHED ON THE LEADING EDGE AND CHANGED ON FOLLOWING EDGE OF SERIAL CLOCK
1—DATA CHANGED ON THE LEADING EDGE AND LATCHED ON FOLLOWING EDGE OF SERIAL CLOCK

LSBF2: LEAST SIGNIFICANT BIT FIRST
0—SERIAL TRANSFER BEGINS WITH MOST SIGNIFICANT BIT FIRST
1—SERIAL TRANSFER BEGINS WITH LEAST SIGNIFICANT BIT FIRST

BIT NUMBER:

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| PE 350 | CONT 351 | DT 352 | | BITS0-4 353 | | | | PSC0 354 | PSC1 355 | PSC2 356 | PSC3 357 | PSC4 358 | PSC5 359 | PSC6 360 | PSC7 361 |

FIG.22

A PORTION OF COMMAND RAM 97

| Address range | Contents |
|---|---|
| $X000 | RESERVED FOR BUS INTERFACE UNIT |
| $X004 | QIECR 270 |
| $X008 | QPCR0 272 |
| $X00C | QPCR1 274 |
| $X010 | QIRCR0 276 |
| $X014 | QIRCR1 278 |
| $X018 | QQPCR 280 |
| $X01C | QQCR 282 |
| $X020 | QCCR 284 |
| $X024 | QCCRQ0 286 |
| $X028 | QCCRQ1 288 |
| $X02C | QCCRQ2 290 |
| $X030 | QCCRQ3 292 |
| $X034 | QQPR 294 |
| $X038 | QQSR 296 |
| $X03C | RESERVED FOR TEST REGISTER |
| $X040 – $X0FC | RESERVED |
| $X100 – $X1FC | RECEIVE RAM 98 |
| $X200 – $X2FC | TRANSMIT RAM 99 |
| $X300 – $X37C | COMMAND RAM 97 |
| $X380 – $X3FC | RESERVED |

QUEUED SERIAL PERIPHERAL INTERFACE HAVING MULTIPLE QUEUES FOR USE IN A DATA PROCESSING SYSTEM

FIELD OF THE INVENTION

The present invention relates in general to a queued serial interface for data communications between components of a data processing system, and more particularly to a queued serial interface having multiple queues.

BACKGROUND OF THE INVENTION

Serial interfaces for data communications between components of data processing systems are numerous. One fairly typical interface definition is referred to as the SPI (Serial Peripheral Interface) which is incorporated in many microcomputers and peripherals designed by Motorola, Inc. of Austin, Tex.

A prior art queued serial peripheral interface (QSPI) is described in U.S. Pat. No. 4,816,996, filed Jul. 24, 1987, entitled QUEUED SERIAL PERIPHERAL INTERFACE FOR USE IN A DATA PROCESSING SYSTEM, invented by Hill et al., which is expressly incorporated by this reference. A prior art queued serial peripheral interface (QSPI) is also described in U.S. Pat. No. 4,958,277, filed Apr. 21, 1989, entitled QUEUED SERIAL PERIPHERAL INTERFACE FOR USE IN A DATA PROCESSING SYSTEM, invented by Hill et al., which is expressly incorporated by this reference.

SUMMARY OF THE INVENTION

The previously mentioned needs are fulfilled and other advantages achieved with the present invention.

In one form, the present invention comprises a serial communication processor having a plurality of multi-entry digital storage elements. Each entry of each multi-entry digital storage element of the plurality of multi-entry digital storage elements includes a data portion and an entry parameter portion. The serial communication processor has a global protocol element that contains global parameters for the plurality of multi-entry digital storage elements. The serial communication processor has a plurality of protocol circuits. A corresponding protocol circuit of the plurality of protocol circuits contains parameters for a corresponding multi-entry digital storage element of the plurality of multi-entry digital storage elements.

The serial communication processor also has serial transfer control logic. The serial transfer control logic is coupled to the plurality of multi-entry digital storage elements, to the global protocol element, and to the plurality of protocol circuits. The serial transfer control logic selects one of the plurality of multi-entry digital storage elements and the corresponding protocol circuit of the one of the plurality of multi-entry digital storage elements. The serial transfer control logic executes a serial data transfer with the one of the plurality of multi-entry digital storage elements based on the parameters contained in the corresponding protocol circuit, the global parameters, and entry parameters contained in the entry parameter portion.

In an alternate form, the present invention comprises a method for processing serial communications. The method includes the steps of storing global parameters in a first protocol storage circuit, storing a first set of parameters in a second protocol storage circuit, and storing a second set of parameters in a third protocol storage circuit. The method includes the step of initiating a first serial transfer to transfer data with a first entry in a first multi-entry digital storage element, and the step of controlling the first serial transfer using the global parameters and the first set of parameters. The method also includes the step of initiating a second serial transfer to transfer data with a first entry in a second multi-entry digital storage element, and the step of controlling the second serial transfer using the global parameters and the second set of parameters.

The present invention will be understood by one skilled in the art from the detailed description below in conjunction with the accompanying drawings.

BRIEF DESCRIPTION OF THE DRAWINGS

FIG. 4 and FIG. 5 illustrate, in flow diagram form, an example of the operation of serial communication circuitry 10 in accordance with one embodiment of the present invention;

FIG. 8 illustrates, in block diagram form, QSPIM Pin Configuration Register 274 in accordance with one embodiment of the present invention;

FIG. 9 illustrates, in block diagram form, QSPIM Interrupt Request Configuration Register 276 in accordance with one embodiment of the present invention;

FIG. 15 illustrates, in block diagram form, QSPIM Communication Control Register (for Queue 1) 288 in accordance with one embodiment of the present invention;

FIG. 16 illustrates, in block diagram form, QSPIM Communication Control Register (for Queue 2) 290 in accordance with one embodiment of the present invention;

FIG. 21 illustrates, in block diagram form, Command RAM 97 of FIG. 20 in accordance with one embodiment of the present invention; and FIG. 22 illustrates, in block diagram form, a memory map of the serial communication circuitry 10 of FIG. 3.

DESCRIPTION OF THE PREFERRED EMBODIMENTS

Figure 2:
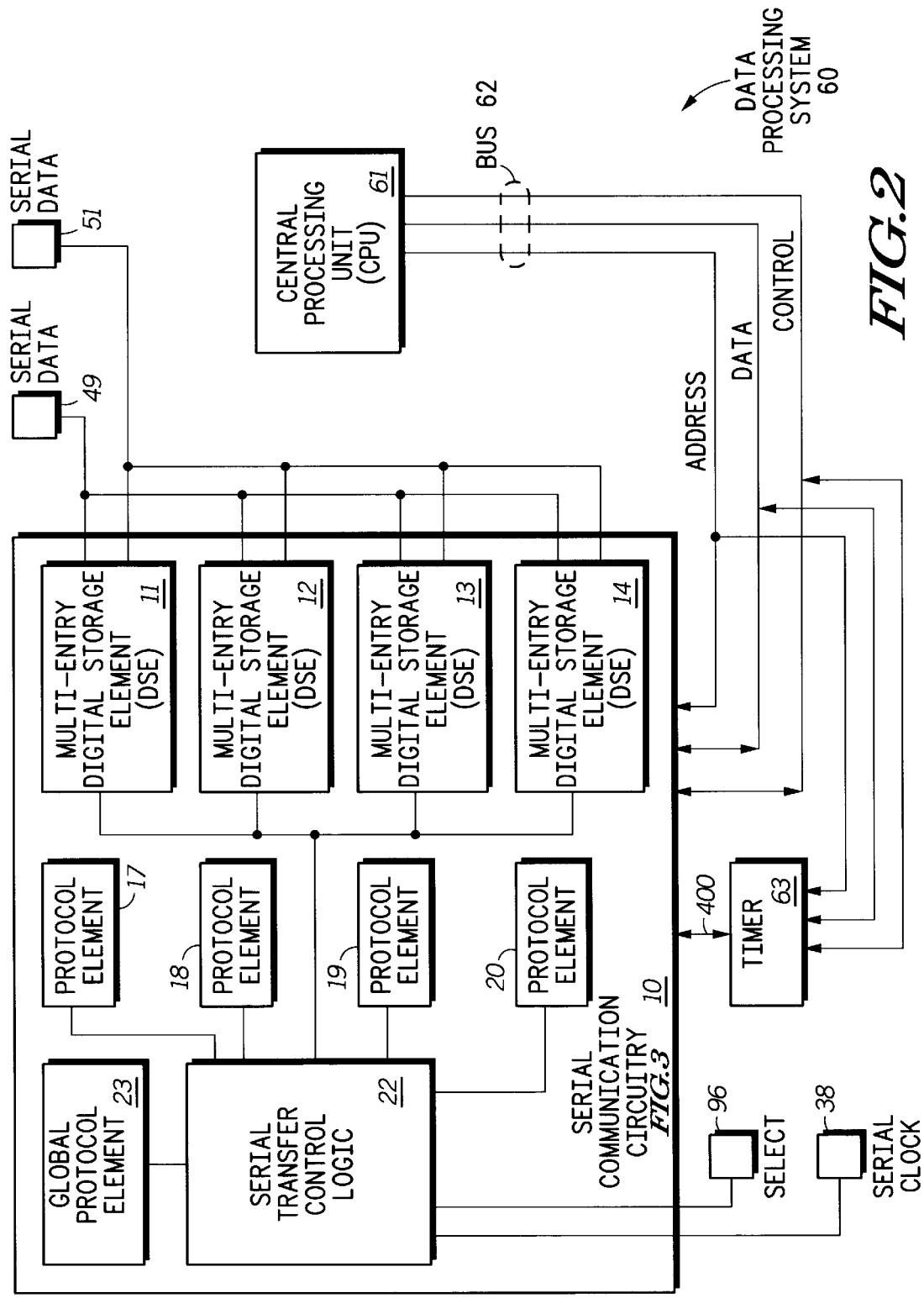
FIG. 2 illustrates, in block diagram form, a data processing system 60 in accordance with an alternate embodiment of the present invention.

The present invention provides a queued serial interface for data communications between components of a data processing system. Referring to FIG. 2, this is accomplished by having serial communication circuitry 10 which has multiple queues (e.g. multi-entry digital storage elements (DSE) 11–14), a set of global communication protocol parameters (i.e. global parameters), a set of communication protocol parameters for each queue (i.e. per-queue parameters), and a set of per-entry communication protocol parameters (i.e. per-entry parameters). Serial transfer control logic circuit 28 (see FIG. 3) controls the serial transfer of each queue entry (e.g. entry 52) based upon global parameters, per-queue parameters, and per-entry parameters.

In general, serial communication circuitry 10 is used to communicate serially with one or more serial communication devices in the following manner (see FIG. 2). First, the global parameters are stored in global protocol element 23. Second, for each queue that is being used for serial transfer, the per-queue parameters are stored in the corresponding protocol element of elements 17–20 (see FIG. 3). In one embodiment, the per-queue parameters are stored in user programmable registers located in protocol elements 17–20. Third, the per-entry parameters and the data to be transmitted is stored in one or more of the queues (i.e. the multi-entry digital storage elements (DSE) 11–14). Note that these three steps described above can be performed in any order.

Once the transmit data, global parameters, per-queue parameters, and per-entry parameters have been properly stored by way of write instructions or data transfer instructions to serial communication circuitry 10, serial communication circuitry 10 is ready to perform serial data transfers. When a queue is triggered (i.e. receives a signal which initiates the transfer of data), the data from the queue is transferred serially using the per-entry parameters, the per-queue parameters associated with that particular queue, and the global parameters associated with all the queues. The data from each queue that is triggered will be transferred in a similar manner, although the actual values of the per-entry and per-queue parameters may vary.

Serial communication circuitry 10 has a variety of features which are new over the prior art. Because serial communication circuitry 10 has multiple queues which use global, per-queue, and per-entry parameters, less intervention is required by a central processing unit (CPU) such as CPU 61 in FIG. 1 and FIG. 2. Using the present invention, CPU 61 can initialize a plurality of queues so that serial communication circuitry 10 can communicate with a wide variety of peripheral devices. Each queue can be programmed to have a different set of per-queue communication protocol parameters. Thus where the prior art may have required CPU 61 to re-program the serial communication interface multiple times, the present invention allows the serial interface, namely serial communication circuitry 10, to continue operation with little or no re-programming required by CPU 61.

In addition, the present invention allows serial communication circuitry 10 to perform data transfers in response to the assertion of a trigger signal from a timer 63. Thus data transfers can be more precisely related to a particular timing signal or set of timing signals. For example, serial communication circuitry 10 can transfer data to an analog-to-digital converter to initiate an analog-to-digital conversion in response to the assertion of a particular timing signal. As a result, time related events can be more closely related to serial data transfers. The ability to more closely relate data transfers to particular timing signals is especially useful in the context of controlling a system, such as an automobile engine or an appliance.

Note that in one embodiment of the present invention, serial communication circuitry 10 is also called the queued serial peripheral interface module (QSPIM).

Description of the Figures

The present invention can be more fully understood with reference to FIGS. 1–22. Each block illustrated in FIGS. 4–5 represents one or more steps in a flow chart. Each block illustrated in FIGS. 1–3 and FIGS. 6–22 represents circuitry.

The term "bus" will be used to refer to a plurality of signals which may be used to transfer one or more various types of information, such as data, addresses, control, or status. The symbol "$" preceding a number indicates that the number is represented in its hexadecimal or base sixteen form. The symbol "%" preceding a number indicates that the number is represented in its binary or base two form.

The terms "assert" and "negate" will be used when referring to the rendering of a signal, status bit, or similar apparatus into its logically true or logically false state, respectively. If the logically true state is a digital logic level one, the logically false state will be a digital logic level zero. And if the logically true state is a digital logic level zero, the logically false state will be a digital logic level one.

Figure 1:
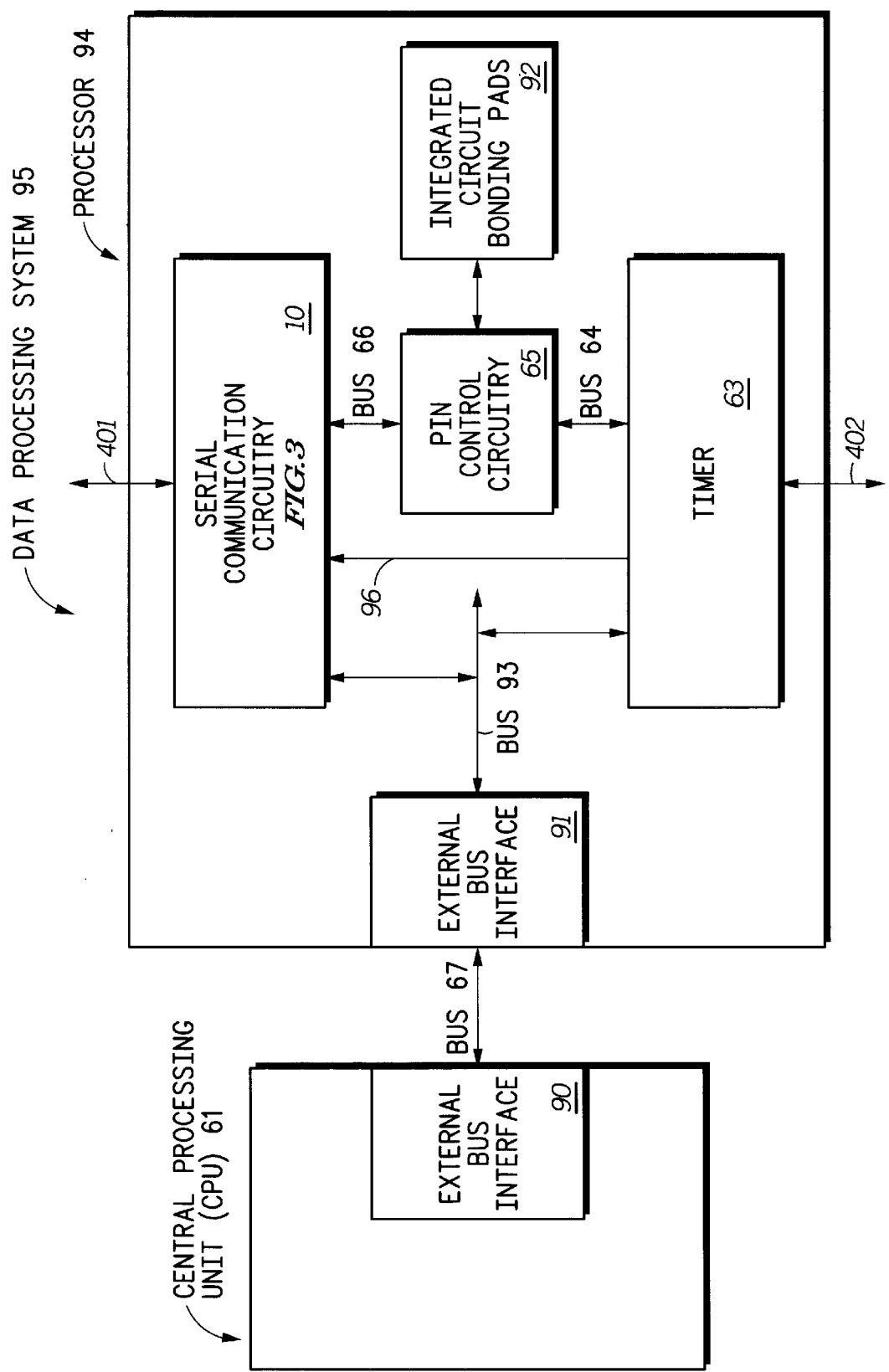
FIG. 1 illustrates, in block diagram form, a data processing system 95 in accordance with one embodiment of the present invention.

FIG. 1 illustrates a data processing system 95 in accordance with one embodiment of the present invention. Data processing system 95 has a central processing unit (CPU) 61 and a processor 94 which are bi-directionally coupled by way of bus 67. CPU 61 has an external bus interface 90. Processor 94 has an external bus interface 91 which is bi-directionally coupled to serial communication circuitry 10 and timer 63 by way of bus 93.

Serial communication circuitry 10 is bi-directionally coupled to pin control circuitry 65 by way of bus 66. Timer 63 is bi-directionally coupled to pin control circuitry 65 by way of bus 64. Pin control circuitry 65 is bi-directionally coupled to integrated circuit bonding pads 92. In some embodiments of the present invention, timer 63 provides one or more timing signals to serial communication circuitry 10 by way of one or more conductors 96. Serial communication circuitry 10 may be bi-directionally coupled external to processor 94 by way of integrated circuit bonding pads 401. Similarly, timer 63 may be bi-directionally coupled external to processor 94 by way of integrated circuit bonding pads 402.

In one embodiment of the present invention, processor 94 is formed on one semiconductor integrated circuit and CPU 61 is formed on a separate semiconductor integrated circuit. In an alternate embodiment of the present invention, both processor 94 and CPU 61 are formed on the same semiconductor integrated circuit. In yet another embodiment of the present invention, CPU 61, timer 63, and serial communication circuitry 10 may all be formed on separate semiconductor integrated circuits. Alternately, serial communication circuitry 10 and CPU 61 may be formed on one semiconductor integrated circuit, and timer 63 may be formed on a separate semiconductor integrated circuit.

FIG. 2 illustrates a data processing system 60 in accordance with an alternate embodiment of the present invention. Data processing system 60 has a central processing unit (CPU) 61 which is bi-directionally coupled to both serial communication circuitry 10 and timer 63 by way of bus 62. In one embodiment, bus 62 includes separate address, data and control conductors. In alternate embodiments of the present invention, one or more of the conductors of bus 62 may multiplex between a plurality of functions. In some embodiments of the present invention, timer 63 is coupled to serial communication circuitry 10 by way of conductors 400. In one embodiment, timer 63 provides one or more timing signals (i.e. trigger signals) to serial communication circuitry 10 by way of conductors 400.

Data processing system 60 also has a plurality of integrated circuit bonding pads 38,49,51, and 96. In some embodiments of the present invention, each one of bonding pads 38, 49, 51, and 96 is coupled to a corresponding integrated circuit pin (not shown). In one embodiment of the present invention, data bonding pad 49 is used to receive and/or provide the MISO (Master-In Slave-Out) serial data signal, and data bonding pad 51 is used to receive and/or provide the MOSI (Master-Out Slave-In) serial data signal. Likewise, serial clock bonding pad 38 is used to receive and/or provide the SCK (Serial Clock) signal. And in some embodiments of the present invention, data processing system 60 includes one or more select bonding pads 96 which are used to provide peripheral chip select signals and/or to receive the SS (Slave Select) signal.

Serial communication circuitry 10 includes serial transfer control logic 22, which is coupled to a plurality of multi-entry digital storage elements 11–14, a plurality of protocol elements 17–20, a global protocol element 23, and integrated circuit bonding pads 38 and 96. Each of the multi-entry digital storage elements 11–14 is coupled to integrated circuit bonding pad 49 and is coupled to integrated circuit bonding pad 51.

Figure 3:
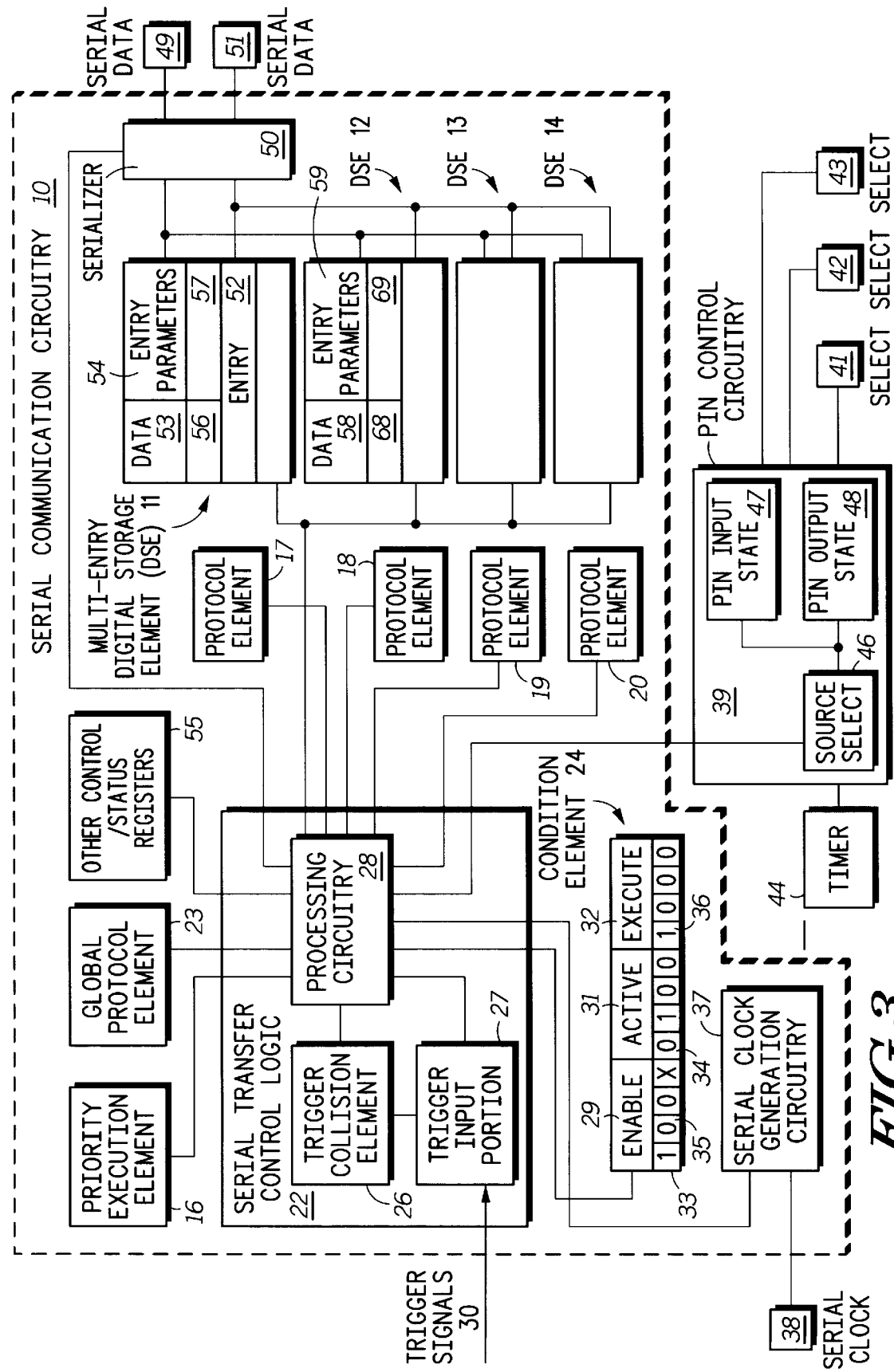
FIG. 3 illustrates, in block diagram form, serial communication circuitry 10 of FIG. 1 and FIG. 2 and associated circuitry in accordance with one embodiment of the present invention.

FIG. 3 illustrates one embodiment of serial communication circuitry 10 of FIG. 1 and FIG. 2, as well as some associated circuitry. Serial transfer control logic 22 includes trigger input portion 27, trigger collision element 26, and processing circuitry 28, which are all coupled to each other. Trigger input portion 27 receives a trigger signal 30. In some embodiments of the present invention, trigger signal 30 is provided by timer 44.

Processing circuitry 28 is coupled to condition element 24. Condition element 24 has an enable portion 29, an active portion 31, and an execute portion 32. Enable portion 29 includes a storage bit 33 and a storage bit 35; active portion 31 includes a storage bit 34; and execute portion 32 includes a storage bit 36. Processing circuitry 28 is also coupled to priority element 16, global protocol element 23, other control/status registers 55, serializer 50, protocol elements 17–20, multi-entry digital storage elements (DSE) 11–14, pin control circuitry 39, and serial clock generation circuitry 37.

Serial clock generation circuitry 37 is coupled to integrated circuit bonding pad 38. In one embodiment of the present invention, integrated circuit bonding pad 38 is used to receive and/or provide the SCK (Serial Clock) signal. Pin control circuitry 39 includes source select 46, pin input state 47, and pin output state 48, which are all coupled to each other. Pin control circuitry 39 is coupled to timer 44, and to integrated circuit bonding pads 41–43. In one embodiment of the present invention, integrated circuit bonding pads 41–43 are used to provide peripheral chip select signals and/or to receive the SS (Slave Select) signal. Each multi-entry digital storage element (DSE) 11–14 is coupled to serializer 50. Serializer 50 is coupled to integrated circuit bonding pads 49 and 51. In one embodiment of the present invention, integrated circuit bonding pads 49 and 51 are used to receive and/or provide the MISO (Master-In Slave-Out) and the MOSI (Master-Out Slave-In) serial data signals.

Each multi-entry digital storage elements (DSE) 11–14 has a plurality of entries, such as entry 52 in DSE 11. Each entry has a data portion (e.g. data portion 53 and data portion 56 in DSE 11; and data portion 58 and data portion 68 in DSE 12). Each entry also has an entry parameter portion (e.g. entry parameter portion 54 and entry parameter portion 57 in DSE 11; and entry parameter portion 59 and entry parameter portion 69 in DSE 12). Note that in DSE 11, data portion 53 and entry parameter portion 54 form one entry; likewise, data portion 56 and entry parameter portion 57 form one entry. In DSE 12, data portion 58 and entry parameter portion 59 form one entry; likewise, data portion 68 and entry parameter portion 69 form one entry.

FIG. 4 and FIG. 5 illustrate, in flow diagram form, the operation of serial communication circuitry 10 in accordance with one embodiment of the present invention. Rectangles 70–72 and 74–87 represent steps which are performed in order to initialize and operate one embodiment of serial communication circuitry 10.

Figure 6:
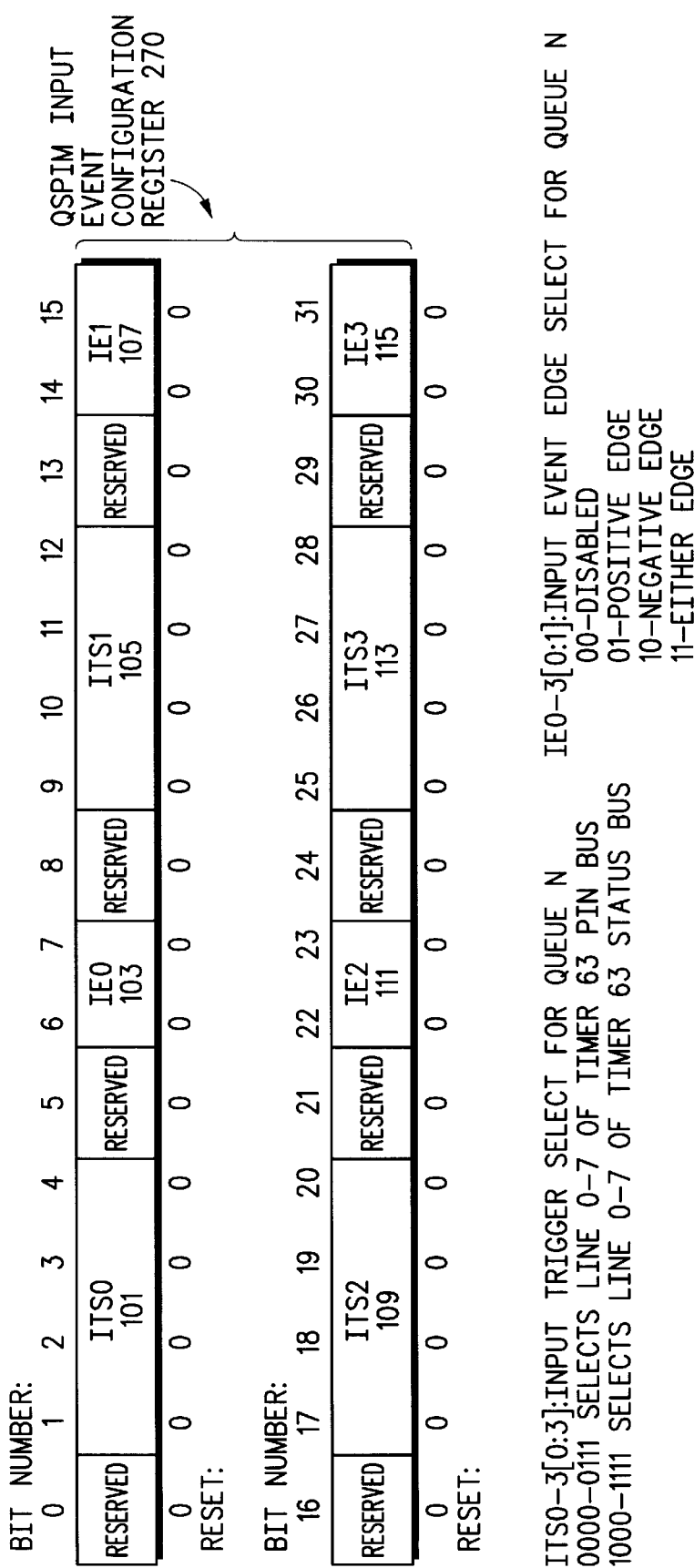
FIG. 6 illustrates, in block diagram form, QSPIM Input Event Configuration Register 270 in accordance with one embodiment of the present invention.

FIG. 6 illustrates one embodiment of a QSPIM Input Event Configuration Register 270, which is part of serial communication circuitry 10. In one embodiment of the present invention, the QSPIM Input Event Configuration Register 270 is located in the other control/status registers 55 in FIG. 3. QSPIM Input Event Configuration Register 270 includes Input Trigger Select register storage bits (ITS0) 101 for queue0 (i.e. multi-entry digital storage elements (DSE) 11). QSPIM Input Event Configuration Register 270 includes Input Trigger Select register storage bits (ITS1) 105 for queue1 (i.e. DSE 12). QSPIM Input Event Configuration Register 270 includes Input Trigger Select register storage bits (ITS2) 109 for queue2 (i.e. DSE 13). And, QSPIM Input Event Configuration Register 270 includes Input Trigger Select register storage bits (ITS3) 113 for queue3 (i.e. DSE 14).

In addition, QSPIM Input Event Configuration Register 270 includes Input Event Edge Select register storage bits (IE0) 103 for queue0 (i.e. DSE 11). QSPIM Input Event Configuration Register 270 includes Input Event Edge Select register storage bits (IE1) 107 for queue1 (i.e. DSE 12). QSPIM Input Event Configuration Register 270 includes Input Event Edge Select register storage bits (IE2) 111 for queue2 (i.e. DSE 13). And, QSPIM Input Event Configuration Register 270 includes Input Event Edge Select register storage bits (IE3) 115 for queue3 (i.e. DSE 14).

Figure 7:
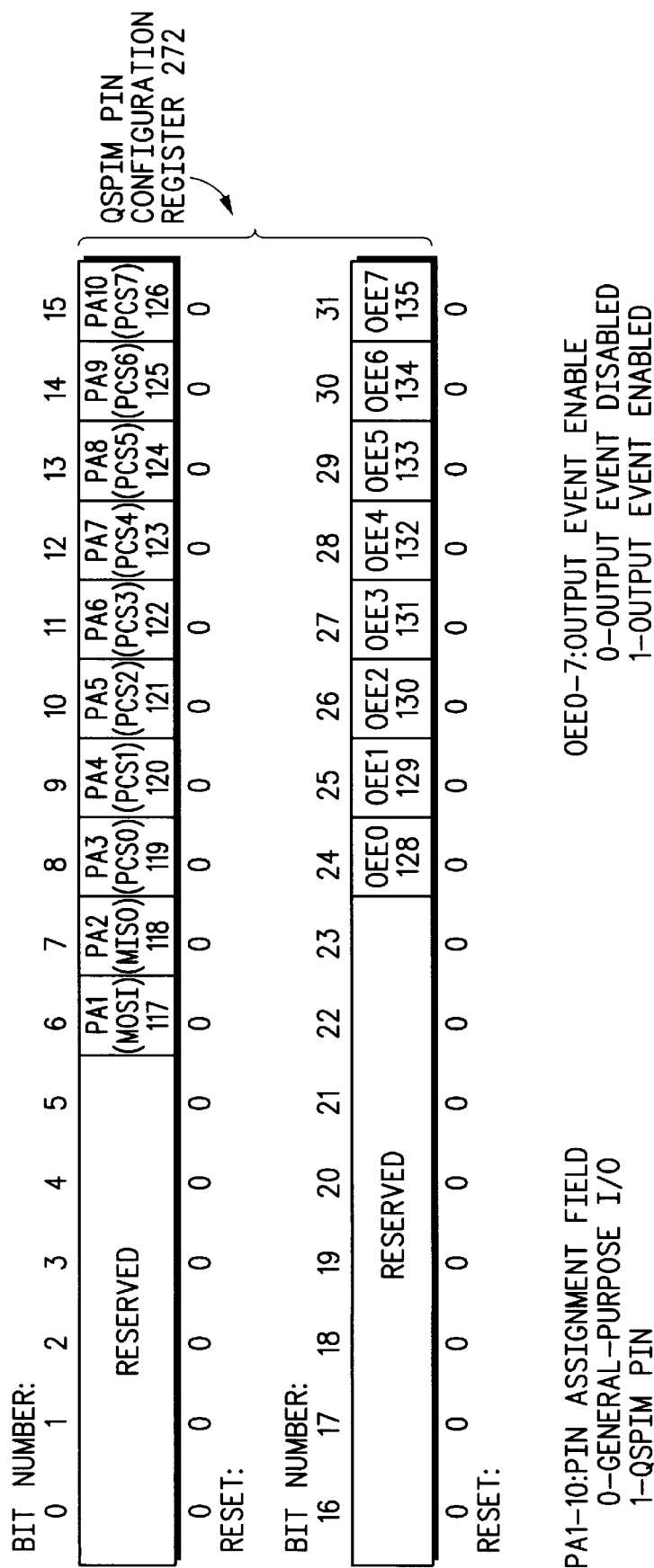
FIG. 7 illustrates, in block diagram form, QSPIM Pin Configuration Register 272 in accordance with one embodiment of the present invention.

FIG. 7 illustrates one embodiment of a QSPIM Pin Configuration Register 272, which is part of serial communication circuitry 10. In one embodiment of the present invention, the QSPIM Input Event Configuration Register 270 is located in the other control/status registers 55 in FIG. 3. The QSPIM Pin Configuration Register 272 includes Pin Assignment register storage bits (PA1–10) 117–126 and Output Event Enable register storage bits (OEE0–7) 128–135.

FIG. 8 illustrates one embodiment of a QSPIM Pin Configuration Register 274, which is part of serial communication circuitry 10. In one embodiment of the present invention, the QSPIM Pin Configuration Register 274 is located in the other control/status registers 55 in FIG. 3. The QSPIM Pin Configuration Register 274 includes Port Data register storage bits (PD0–10) 137–147 and Data Direction register storage bits (DD0–10) 149–159.

FIG. 9 illustrates one embodiment of a QSPIM Interrupt Request Configuration Register 276, which is part of serial communication circuitry 10. In one embodiment of the present invention, the QSPIM Interrupt Request Configuration Register 276 is located in the other control/status registers 55 in FIG. 3. The QSPIM Interrupt Request Configuration Register 276 includes Interrupt Level register storage bits (ILE0–3) 162, 165, 168, and 171, as well as Queue End Interrupt Enable register storage bits (QEIE0–3) 161, 164, 167, and 170. Note that the ILE0 bits 162 and the QEIE0 bits 161 are used with queue0 (i.e. DSE 11). Note that the ILE1 bits 165 and the QEIE1 bits 164 are used with queue1 (i.e. DSE 12). Note that the ILE2 bits 168 and the QEIE2 bits 167 are used with queue2 (i.e. DSE 13). And, note that the ILE3 bits 171 and the QEIE3 bits 170 are used with queue3 (i.e. DSE 14).

Figure 10:
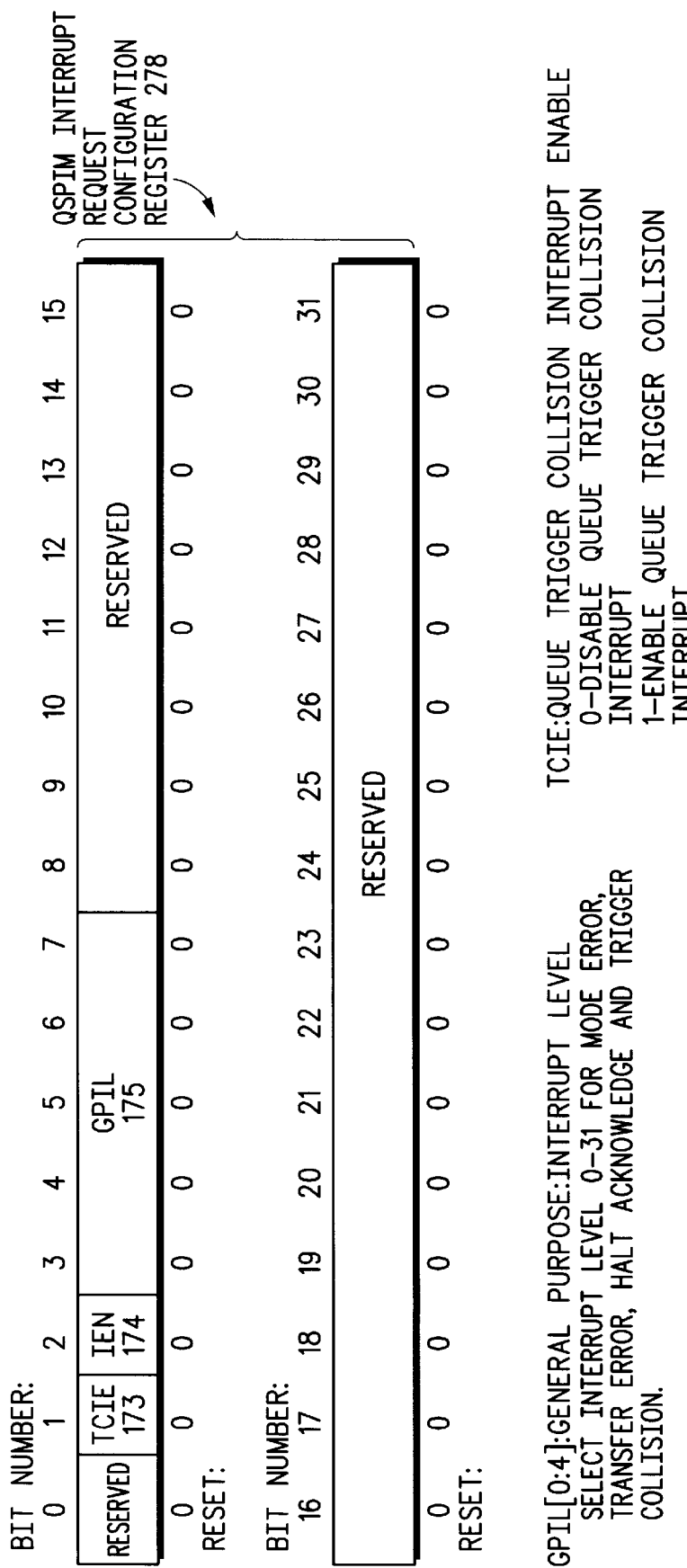
FIG. 10 illustrates, in block diagram form, QSPIM Interrupt Request Configuration Register 278 in accordance with one embodiment of the present invention.

FIG. 10 illustrates one embodiment of a QSPIM Interrupt Request Configuration Register 278, which is part of serial communication circuitry 10. In one embodiment of the present invention, the QSPIM Interrupt Request Configuration Register 278 is located in the other control/status registers 55 in FIG. 3. The QSPIM Interrupt Request Configuration Register 278 includes General Purpose Interrupt Level register storage bits (GPIL0–4) 175, Interrupt Enable register storage bit (IEN) 174, and Queue Trigger Collision Interrupt Enable register storage bit (TCIE) 173.

Figure 11:
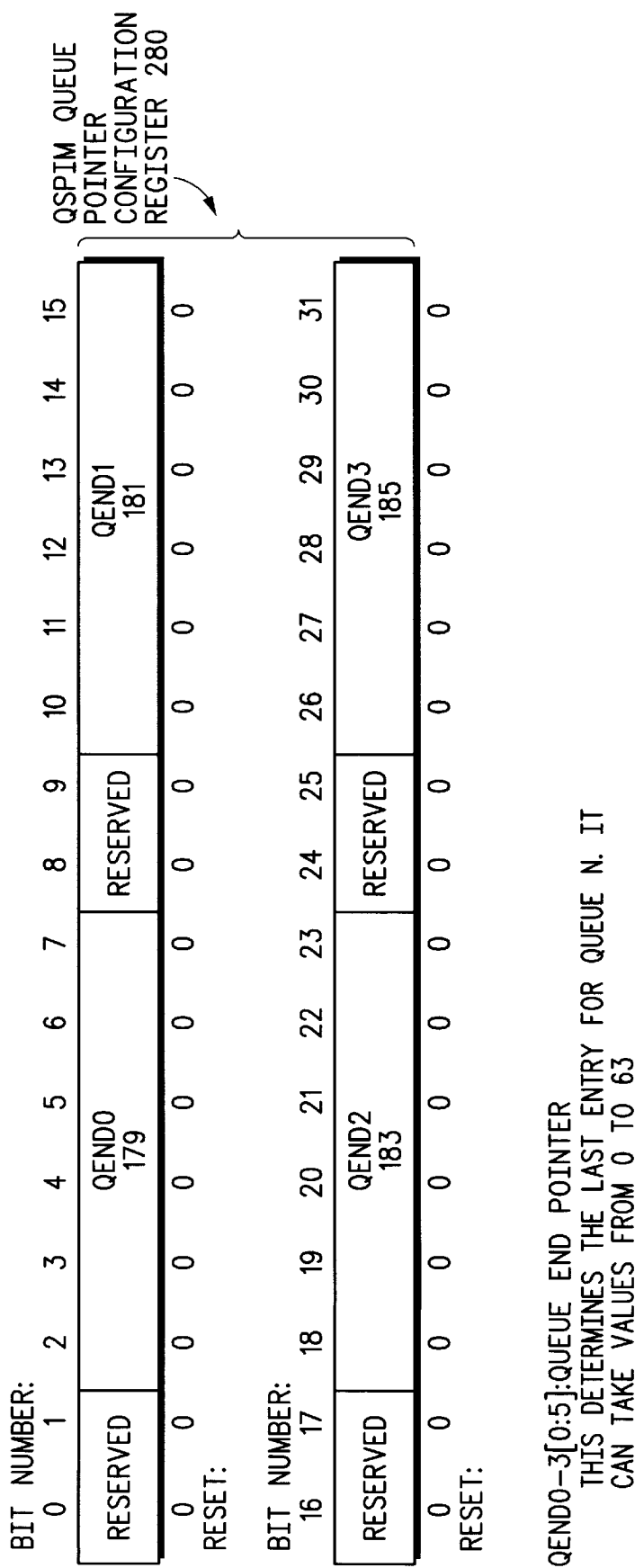
FIG. 11 illustrates, in block diagram form, QSPIM Queue Pointer Configuration Register 280 in accordance with one embodiment of the present invention.

FIG. 11 illustrates one embodiment of a QSPIM Queue Pointer Configuration Register 280, which is part of serial communication circuitry 10. In one embodiment of the present invention, the QSPIM Queue Pointer Configuration Register 280 is located in the other control/status registers 55 in FIG. 3. The QSPIM Queue Pointer Configuration Register 280 includes Queue End Pointer register storage bits (QEND0–3) 179, 181, 183, and 185. Note that the QEND0 bits 179 are used with queue0 (i.e. DSE 11). Note that the QEND1 bits 181 are used with queue1 (i.e. DSE 12). Note that the QEND2 bits 183 are used with queue2 (i.e. DSE 13). And, note that the QEND3 bits 185 are used with queue3 (i.e. DSE 14).

Figure 12:
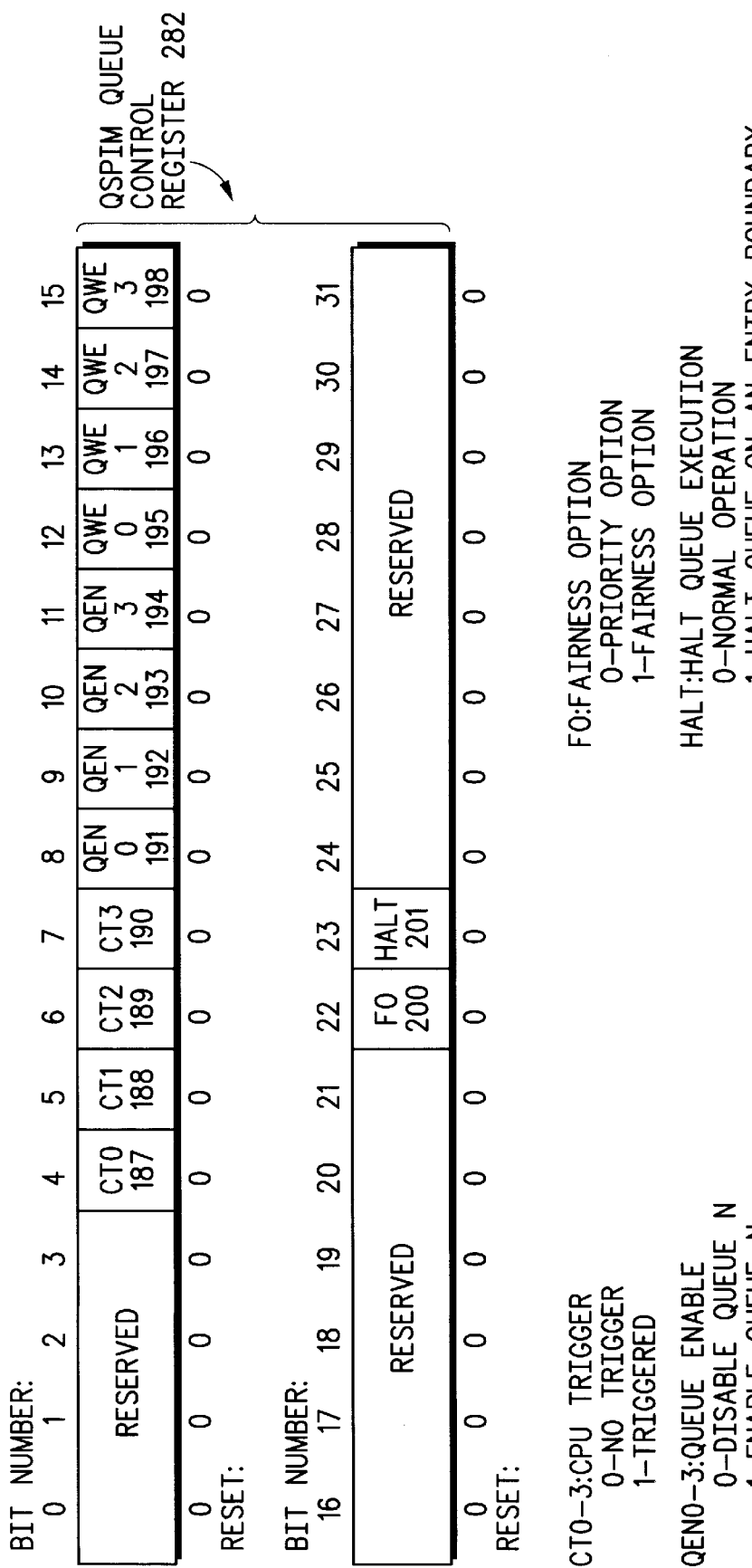
FIG. 12 illustrates, in block diagram form, QSPIM Queue Control Register 282 in accordance with one embodiment of the present invention.

FIG. 12 illustrates one embodiment of a QSPIM Queue Control Register 282, which is part of serial communication circuitry 10. In one embodiment of the present invention, the QSPIM Queue Control Register 282 is located in the other control/status registers 55 in FIG. 3. The QSPIM Queue Control Register 282 includes CPU Trigger register storage bits (CT0–3) 187–190, Queue Enable register storage bits (QEN0–3) 191–194, Queue Wrap Enable register storage bits (QWE0–3) 195–198, Fairness Option register storage bit (FO) 200, and Halt Queue Execution register storage bit (HALT) 201. In one embodiment of the present invention, the QEN0–3 bits 191–194 are located in enable portion 29, and the FO bit 200 is located in the priority execution element 16 (see FIG. 3).

Figure 13:
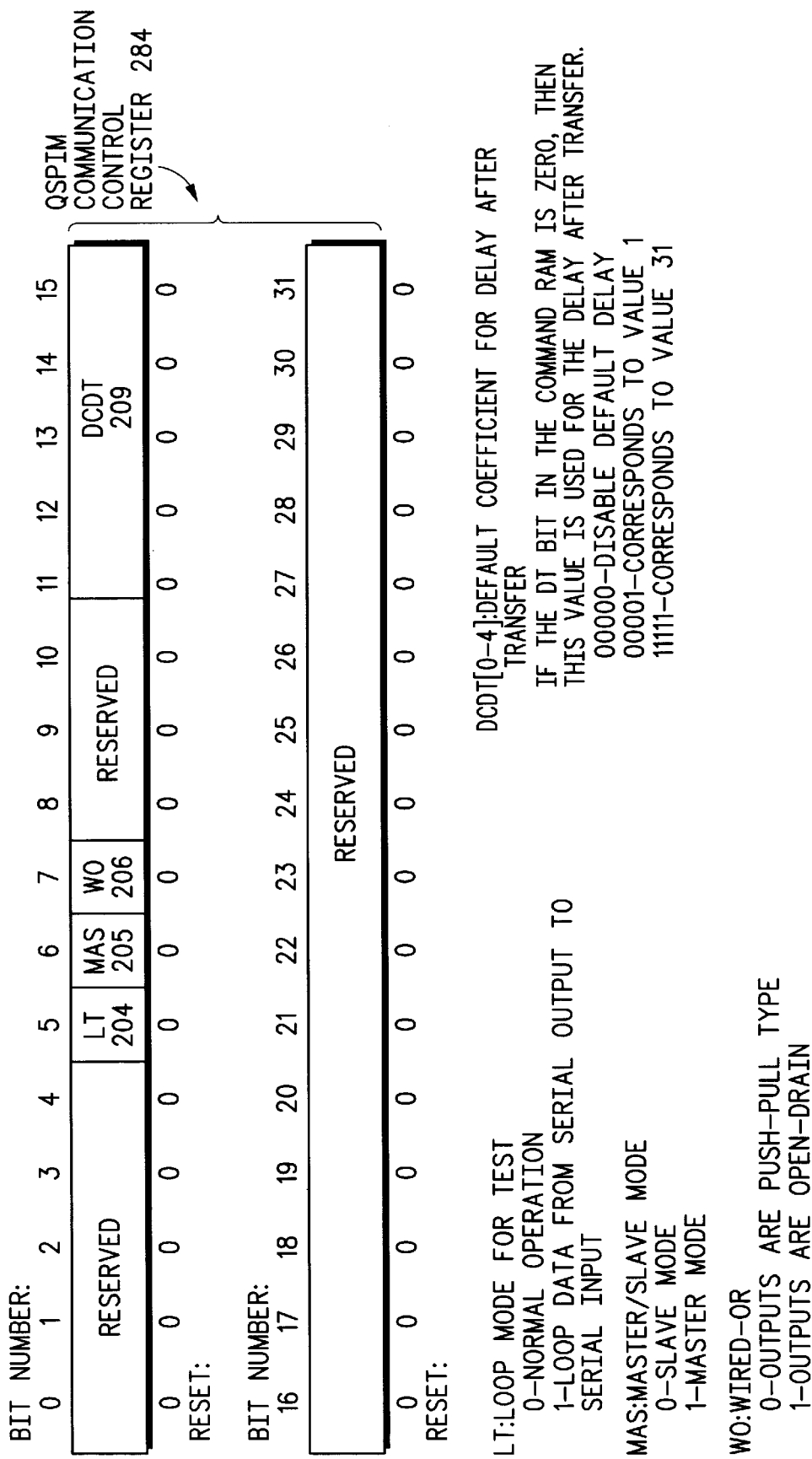
FIG. 13 illustrates, in block diagram form, QSPIM Communication Control Register 284 in accordance with one embodiment of the present invention.

FIG. 13 illustrates one embodiment of a QSPIM Communication Control Register 284, which is part of serial communication circuitry 10. In one embodiment of the present invention, the QSPIM Communication Control Register 284 is located in the other control/status registers 55 in FIG. 3. In an alternate embodiment of the present invention, the QSPIM Communication Control Register 284 is located in global protocol element 23. The QSPIM Communication Control Register 284 includes Loop Mode For Test register storage bit (LT) 204, Master/Slave Mode register storage bit (MAS) 205, Wired-OR register storage bit (WO) 206, and Default Coefficient For Delay After Transfer register storage bits (DCDT) 209.

Figure 14:
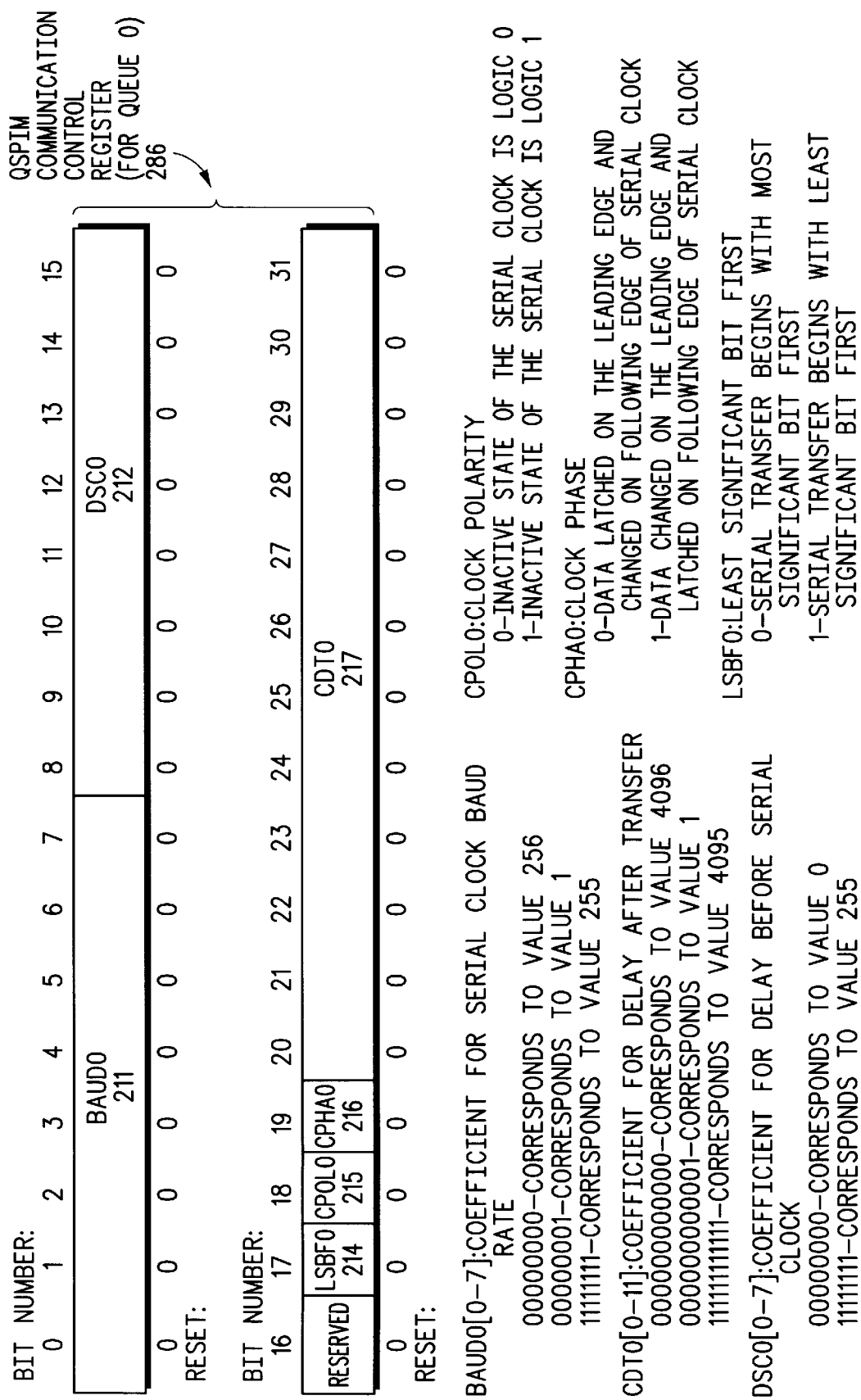
FIG. 14 illustrates, in block diagram form, QSPIM Communication Control Register (for Queue 0) 286 in accordance with one embodiment of the present invention.

FIG. 14 illustrates one embodiment of a QSPIM Communication Control Register (for Queue 0) 286, which is part of serial communication circuitry 10. The QSPIM Communication Control Register (for Queue 0) 286 stores per-queue parameters which are used to control queue0 (i.e. DSE 11). In one embodiment of the present invention, the QSPIM Communication Control Register (for Queue 0) 286 is located in the other control/status registers 55 in FIG. 3. In an alternate embodiment of the present invention, the QSPIM Communication Control Register (for Queue 0) 286 is located in protocol element 17.

The QSPIM Communication Control Register (for Queue 0) 286 includes Coefficient For Serial Clock Baud Rate register storage bits (BAUD0) 211, Coefficient For Delay After Transfer register storage bits (CDT0) 217, Coefficient For Delay Before Serial Clock register storage bits (DSC0) 212, Clock Polarity register storage bit (CPOL0) 215, Clock Phase register storage bit (CPHA0) 216, and Least Significant Bit First register storage bit (LSBF0) 214.

FIG. 15 illustrates one embodiment of a QSPIM Communication Control Register (for Queue 1) 288, which is part of serial communication circuitry 10. The QSPIM Communication Control Register (for Queue 1) 288 stores per-queue parameters which are used to control queue1 (i.e. DSE 12). In one embodiment of the present invention, the QSPIM Communication Control Register (for Queue 1) 288 is located in the other control/status registers 55 in FIG. 3. In an alternate embodiment of the present invention, the QSPIM Communication Control Register (for Queue 1) 288 is located in protocol element 18.

The QSPIM Communication Control Register (for Queue 1) 288 includes Coefficient For Serial Clock Baud Rate register storage bits (BAUD1) 218, Coefficient For Delay After Transfer register storage bits (CDT1) 224, Coefficient For Delay Before Serial Clock register storage bits (DSC1) 219, Clock Polarity register storage bit (CPOL1) 222, Clock Phase register storage bit (CPHA1) 223, and Least Significant Bit First register storage bit (LSBF1) 221.

FIG. 16 illustrates one embodiment of a QSPIM Communication Control Register (for Queue 2) 290, which is part of serial communication circuitry 10. The QSPIM Communication Control Register (for Queue 2) 290 stores per-queue parameters which are used to control queue2 (i.e. DSE 13). In one embodiment of the present invention, the QSPIM Communication Control Register (for Queue 2) 290 is located in the other control/status registers 55 in FIG. 3. In an alternate embodiment of the present invention, the QSPIM Communication Control Register (for Queue 2) 290 is located in protocol element 19.

The QSPIM Communication Control Register (for Queue 2) 290 includes Coefficient For Serial Clock Baud Rate register storage bits (BAUD2) 225, Coefficient For Delay After Transfer register storage bits (CDT2) 231, Coefficient For Delay Before Serial Clock register storage bits (DSC2) 226, Clock Polarity register storage bit (CPOL2) 229, Clock Phase register storage bit (CPHA2) 230, and Least Significant Bit First register storage bit (LSBF2) 228.

Figure 17:
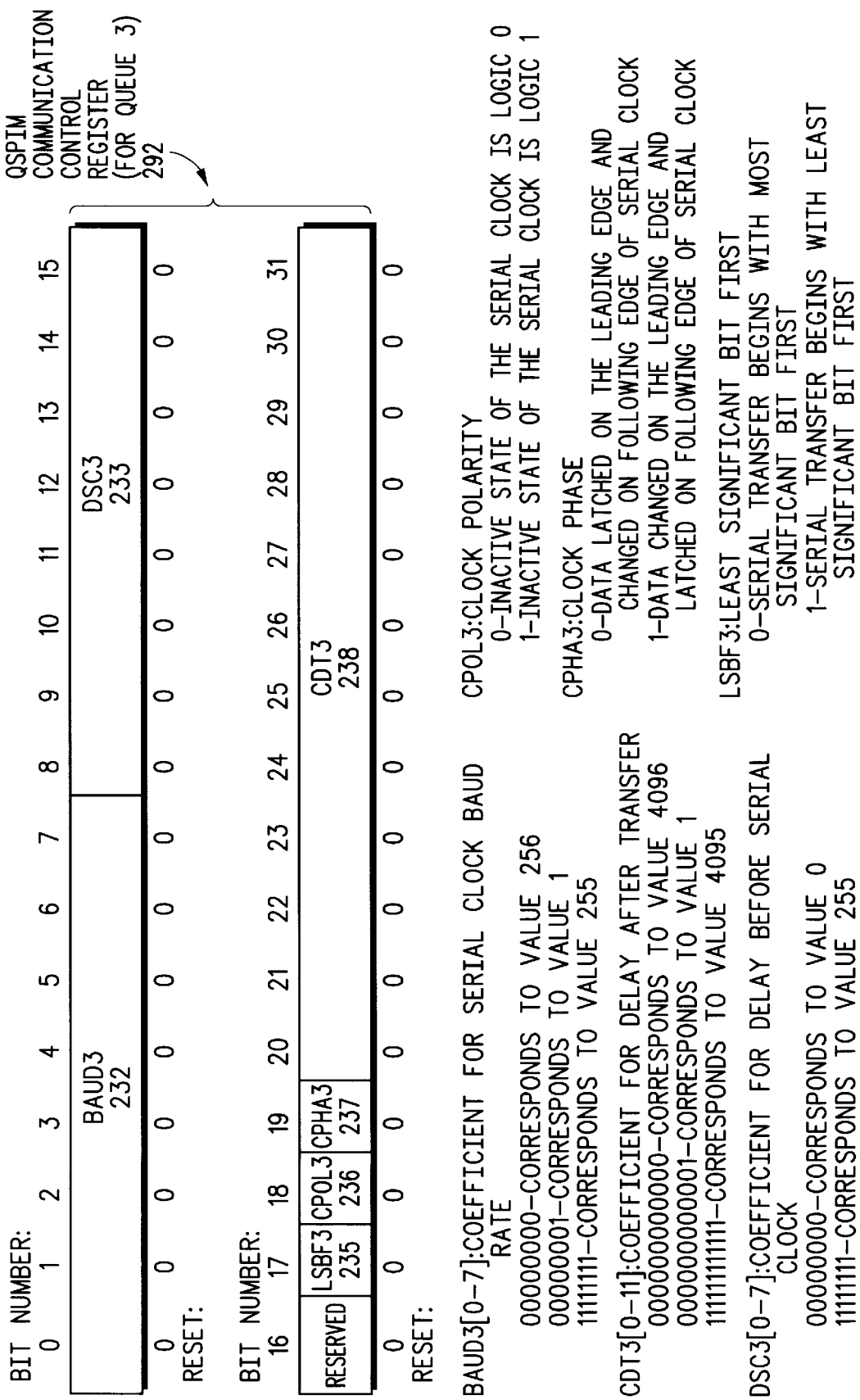
FIG. 17 illustrates, in block diagram form, QSPIM Communication Control Register (for Queue 3) 292 in accordance with one embodiment of the present invention.

FIG. 17 illustrates one embodiment of a QSPIM Communication Control Register (for Queue 3) 292, which is part of serial communication circuitry 10. The QSPIM Communication Control Register (for Queue 3) 292 stores per-queue parameters which are used to control queue3 (i.e. DSE 14). In one embodiment of the present invention, the QSPIM Communication Control Register (for Queue 3) 292 is located in the other control/status registers 55 in FIG. 3. In an alternate embodiment of the present invention, the QSPIM Communication Control Register (for Queue 3) 292 is located in protocol element 20.

The QSPIM Communication Control Register (for Queue 3) 292 includes Coefficient For Serial Clock Baud Rate register storage bits (BAUD3) 232, Coefficient For Delay After Transfer register storage bits (CDT3) 238, Coefficient For Delay Before Serial Clock register storage bits (DSC3) 233, Clock Polarity register storage bit (CPOL3) 236, Clock Phase register storage bit (CPHA3) 237, and Least Significant Bit First register storage bit (LSBF3) 235.

Figure 18:
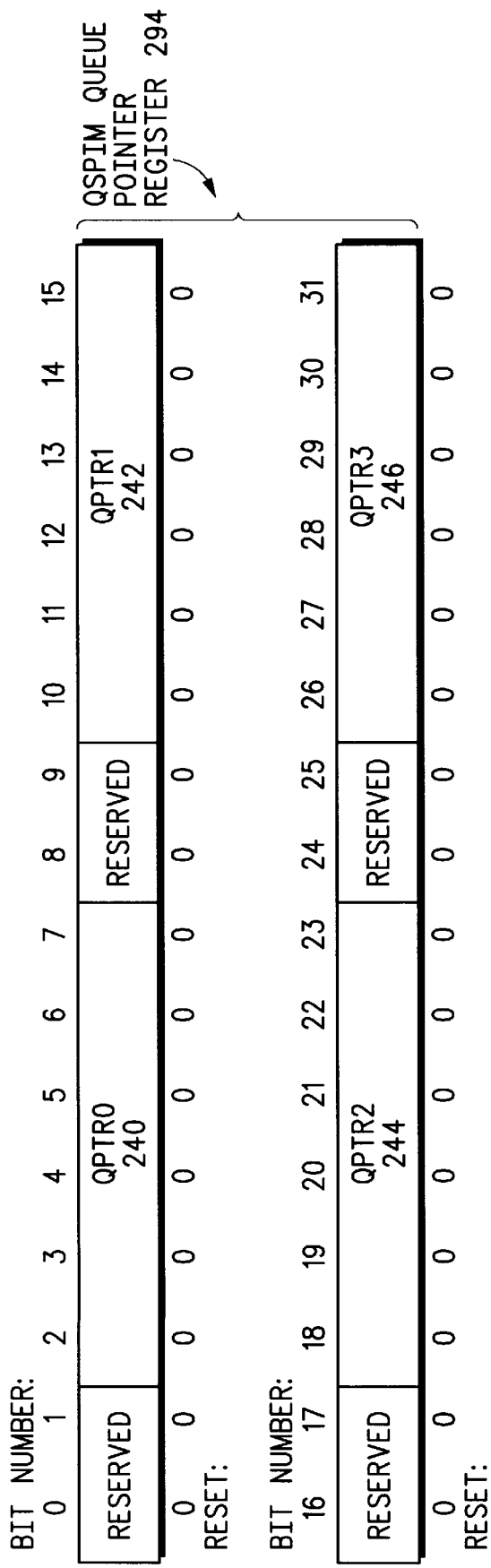
FIG. 18 illustrates, in block diagram form, QSPIM Queue Pointer Register 294 in accordance with one embodiment of the present invention.

FIG. 18 illustrates one embodiment of a QSPIM Queue Pointer Register 294, which is part of serial communication circuitry 10. In one embodiment of the present invention, the QSPIM Queue Pointer Register 294 is located in the other control/status registers 55 in FIG. 3. The QSPIM Queue Pointer Register 294 includes Queue Pointer register storage bits (QPTR0–3) 240, 242, 244, and 246. Note that the QPTR0 bits 240 are used with queue0 (i.e. DSE 11). Note that the QPTR1 bits 242 are used with queue1 (i.e. DSE 12). Note that the QPTR2 bits 244 are used with queue2 (i.e. DSE 13). And, note that the QPTR3 bits 246 are used with queue3 (i.e. DSE 14).

Figure 19:
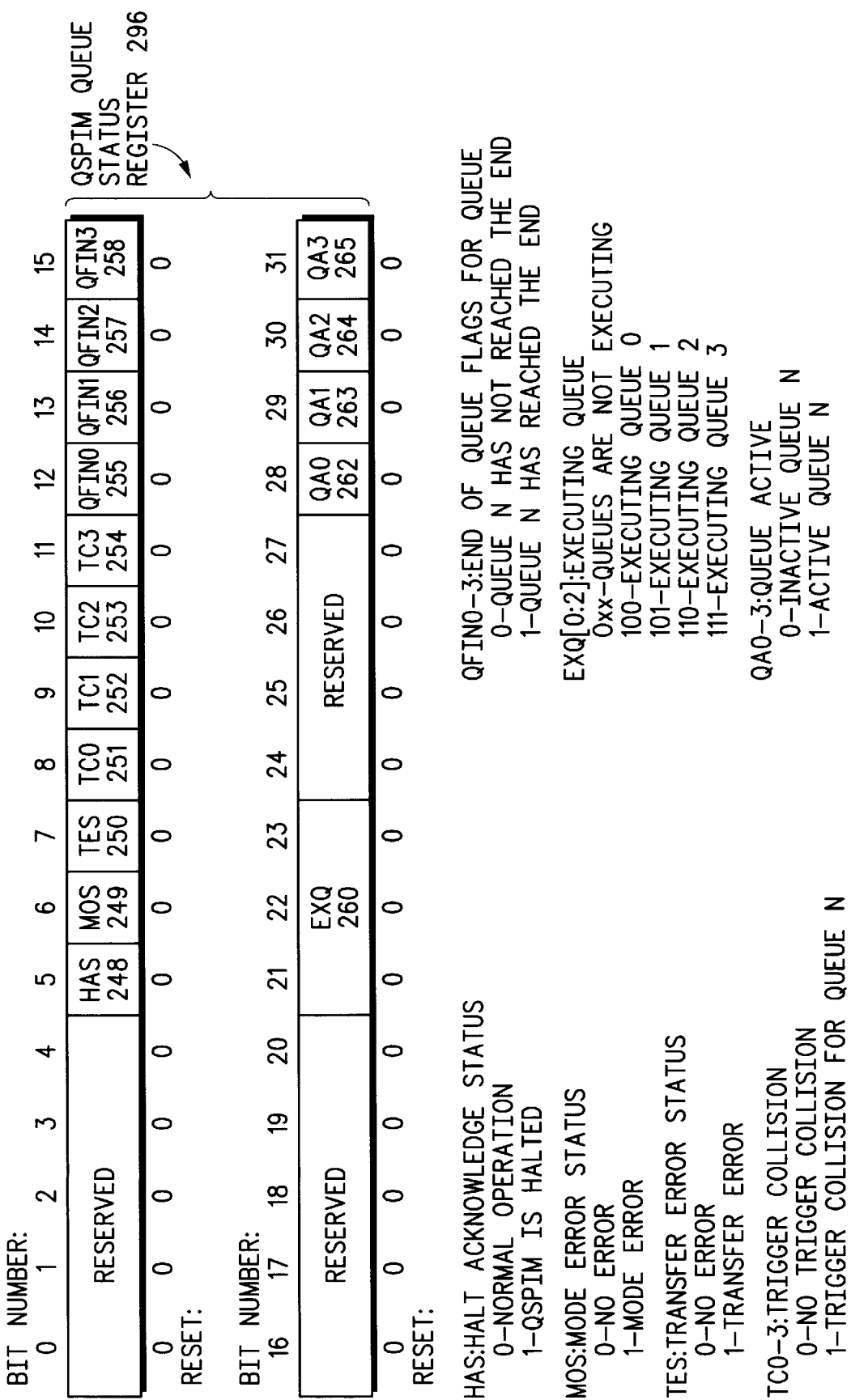
FIG. 19 illustrates, in block diagram form, QSPIM Queue Status Register 296 in accordance with one embodiment of the present invention.

FIG. 19 illustrates one embodiment of a QSPIM Queue Status Register 296, which is part of serial communication circuitry 10. In one embodiment of the present invention, the QSPIM Queue Status Register 296 is located in the other control/status registers 55 in FIG. 3. The QSPIM Queue Status Register 296 stores global status information in Halt Acknowledge Status register storage bit (HAS) 248, Mode Error Status register storage bit (MOS) 249, Transfer Error Status register storage bit (TES) 250, and Executing Queue register storage bits (EXQ) 260.

The QSPIM Queue Status Register 296 also stores per-queue status information which reflects the status of individual queue. For queue0, the QSPIM Queue Status Register 296 includes Trigger Collision register storage bit (TC0) 251, End Of Queue Flag For queue0 register storage bit (QFIN0) 255, and Queue Active register storage bit (QA0) 262. For queue1, the QSPIM Queue Status Register 296 includes Trigger Collision register storage bit (TC1) 252, End Of Queue Flag For Queue1 register storage bit (QFIN1) 256, and Queue Active register storage bit (QA1) 263. For queue2, the QSPIM Queue Status Register 296 includes Trigger Collision register storage bit (TC2) 253, End Of Queue Flag For Queue2 register storage bit (QFIN2) 257, and Queue Active register storage bit (QA2) 264. For queue3, the QSPIM Queue Status Register 296 includes Trigger Collision register storage bit (TC3) 254, End Of Queue Flag For Queue3 register storage bit (QFIN3) 258, and Queue Active register storage bit (QA3) 265.

In one embodiment of the present invention (see FIG. 3), the Trigger Collision register storage bits (TC0–3) 251–254 are located in trigger collision element 26, the Executing Queue register storage bits (EXQ) 260 are located in the execute portion 32, and the Queue Active register storage bits (QA0–3) 262–265 are located in active portion 31.

Figure 20:
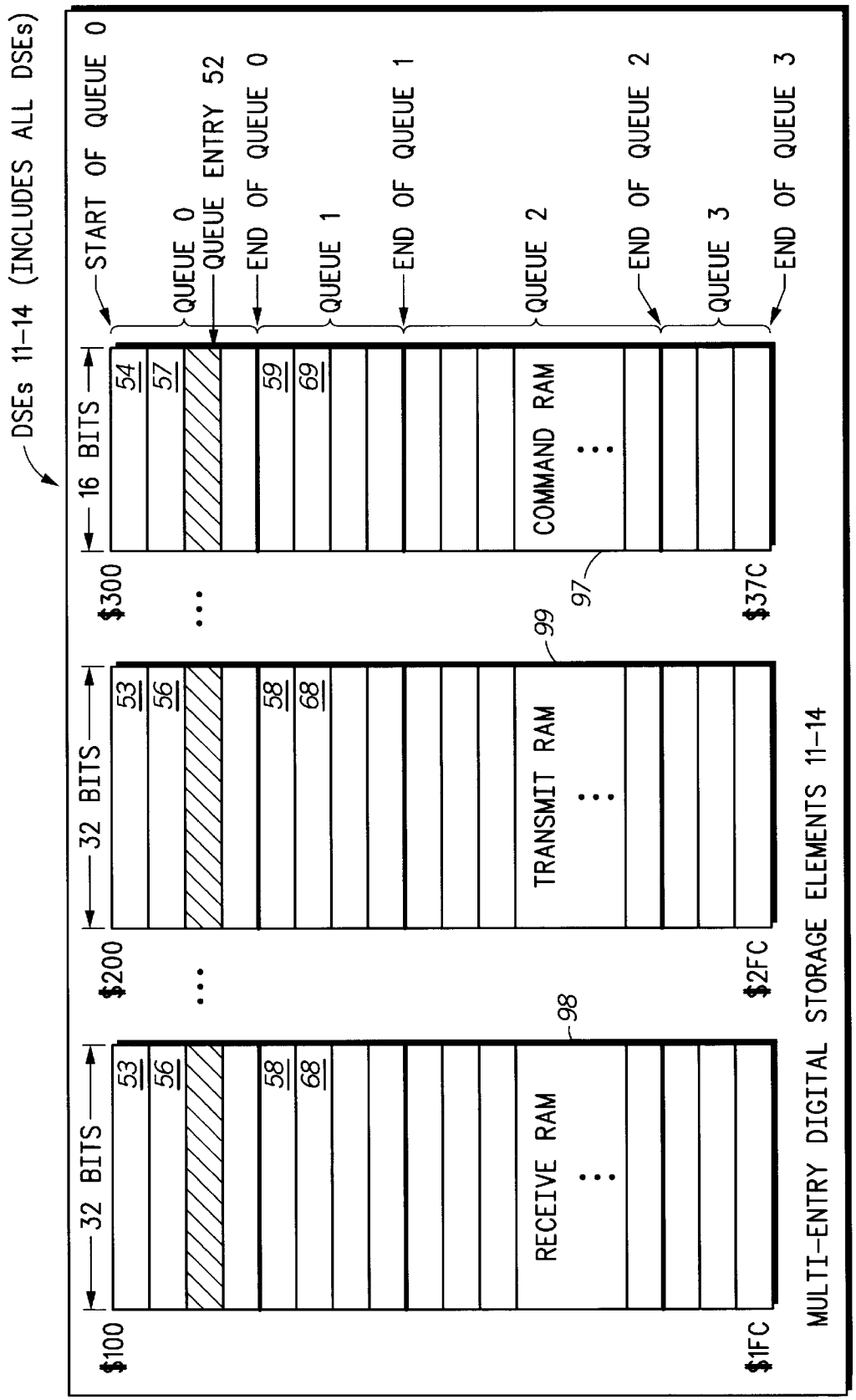
FIG. 20 illustrates, in block diagram form, multi-entry digital storage elements 11–14 of FIG. 2 in accordance with one embodiment of the present invention.

FIG. 20 illustrates one possible implementation of multi-entry digital storage elements (DSEs) 11–14 of FIG. 2. In one embodiment of the present invention, DSEs 11–14 are implemented using an addressable memory structure. For example, in one embodiment of the present invention, each storage bit of DSEs 11–14 may be implemented using a Static Random Access Memory (SRAM) cell. DSEs 11–14 may also be implemented in a different manner. DSE 11 stores information for queue0; DSE 12 stores information for queue1; DSE 13 stores information for queue2; and DSE 14 stores information for queue3.

Referring to FIG. 3 and FIG. 20, each DSE has a plurality of queue entries (e.g. entry 52 in queue0). Each queue entry has a data portion (e.g. data portion 53) and an entry parameter portion (e.g. entry parameter portion 54). FIG. 20 illustrates one embodiment of DSEs 11–14 in which the entry parameter portion of each queue entry includes 16-bits from Command RAM 97, and in which the data portion of each queue entry includes 32-bits from Receive RAM 98 and 32-bits from Transmit RAM 99.

Command RAM 97 is capable of storing a plurality of entry parameters. Each entry parameter is used to control the serial transfer associated with that one queue entry. Transmit RAM 99 is capable of storing a plurality of transmit data values. Each transmit data value may be serially transferred external to serial communication circuitry 10 by way of one of the data bonding pads 49 or 51. Receive RAM 98 is capable of storing a plurality of receive data values. Each receive data value may be serially received from external to serial communication circuitry 10 by way of one of the data bonding pads 49 or 51.

FIG. 21 illustrates one embodiment of one entry parameter (e.g. entry parameter 54 of queue0) of Command RAM 97 (see FIG. 3 and FIG. 20). Note that each entry parameter in Command RAM 97 may have different control values stored in each bit field. In one embodiment, Command RAM 97 includes Peripheral Chip Select storage bits (PCS0–7) 354–361, Delay after Transfer storage bit (DT) 352, Number Of Bits storage bits (BITS0–4) 353, Continue storage bit (CONT) 351, and Pause Enable storage bit (PE) 350.

FIG. 22 illustrates one possible memory map and programmer's model of the serial communication circuitry 10 of FIG. 3. Note that any type of storage circuitry (e.g. latches, RAM cells, etc.) can be used to implement the storage circuits illustrated in FIG. 22.

Operation of the Preferred Embodiments

The operation of data processing system 95 (see FIG. 1), data processing system 60 (see FIG. 2), and serial communication circuitry 10 (see FIG. 3) will now be described.

Serial communication circuitry 10 is used to transfer data between one or more peripheral devices (e.g. an analog-to-digital converter coupled to bonding pads 38,49,51, and 41 of FIG. 3) (not shown) and a processing unit (e.g. central processing unit (CPU) 61 of FIG. 2). Referring to FIG. 3 and FIG. 20, CPU 61 initializes serial communication circuitry 10 by storing global communication protocol parameters in global protocol element 23, by storing per-queue communication protocol parameters for each queue in protocol elements 17, 18, 19, 20, by storing per-entry communication protocol parameters for each entry in Command RAM 97, and by storing transmit data in Transmit RAM 99.

Note that one or more queues may not be used. If a particular queue is not used, its corresponding per-queue parameters, per-entry parameters, and transmit data do not need to be initialized. Note that one or more entries in a queue may not be used. If a particular entry in a queue is not used, its corresponding per-entry parameters and transmit data do not need to be initialized.

In one embodiment of the present invention, each multi-entry digital storage element (DSE) 11–14 is a queue. DSE 11 is queue0; DSE 12 is queue1; DSE 13 is queue2; and DSE 13 is queue3. Protocol element 17, 18, 19, and 20 are used to store per-queue parameters for DSE 11, 12, 13, and 14 respectively. Also, each queue has a corresponding storage bit in each of enable portion 29, active portion 31, and execute portion 32. For example, for queue0 (i.e. DSE 11), storage bit 33 indicates the enabled/disabled status of queue0, storage bit 34 indicates the active/inactive status of queue0, and storage bit 36 indicates the executing/not executing status of queue0.

When trigger input portion 27 in serial transfer control logic 22 receives a trigger signal 30, the processing circuitry 28 determines which queue the trigger signal 30 is to activate. Processing circuitry 28 uses information in condition element 24 and priority execution element 16 to determine if the triggered queue should commence a serial transfer. Enable portion 29 is used to determine if the triggered queue is enabled and is thus allowed to begin transferring data once the trigger signal 30 is received.

An example will now be described (see FIG. 3). For purposes of this example, the asserted state is assumed to be a logic state "1", and the negated state is assumed to be a logic state "0". If the triggered queue is queue0 (i.e. DSE 11), and storage bit 33 of enable portion 29 is asserted to indicate "enabled", then storage bit 34 of active portion 31 is asserted to indicate "active". Active portion 31 is used to indicate whether or not a queue has been triggered and is pending execution of serial transfers. Priority execution element 16 is used by the processing circuitry 28 to select the order of serial transfer execution of the queues. If the priority execution element 16 determines that queue0 is allowed to execute serial transfers, processing circuitry 28 will assert storage bit 36 to indicate "executing", and will negate all other storage bits in execute portion 32.

Serial communication circuitry 10 will then begin to serially transfer data from queue0 (i.e. DSE 11) to peripheral devices (not shown) by way of bonding pad 51, and from peripheral devices back to queue0 by way of bonding pad 49. In this example, bonding pad 49 is functioning as the MISO (Master-In Slave-Out) bonding pad, and bonding pad 51 is functioning as the MOSI (Master-Out Slave-In) bonding pad.

Processing circuitry 28 uses global protocol element 23, protocol element 17, and entry parameters 54 of first entry 52 to determine the serial communication protocol for transferring data to the peripheral device or devices. Data from data portion 53 of first entry 52 is sent to serializer 50 to be converted from parallel to serial format so that the data can be serially transmitted external to serial communication circuitry 10. Serializer 50 is used to transfer data to and from queues0–3 (i.e. DSEs 11–14) one bit at a time (serially) through data bonding pads 49 and 51.

In one embodiment of the present invention, other control/status registers 55 are used for a variety of purposes, including the following: (1) to determine if an interrupt signal should be sent to CPU 61 (see FIG. 1 and FIG. 2); (2) to determine the number of entries to be used in each of the queues0–3 (i.e. the effective size of each queue); and (3) to determine which peripheral chip select(s) to assert and which peripheral chip select(s) to negate. In one embodiment of the present invention, condition element 24 is used to show the status of a queue (e.g. enabled/disabled, active/inactive, and executing/not executing).

The serial clock generation circuitry 37 provides a serial clock signal which is used to synchronize the serial exchange of data between serial communication circuitry 10 and one or more peripheral devices (not shown). Each clock edge of the serial clock signal (SCK) signifies a bit of data being transferred. The serial clock signal (SCK) is transmitted to peripheral devices by way of serial clock bonding pad 38.

Pin control circuitry 39 is used by processing circuitry 28 to assert or negate peripheral chip select signals. Processing circuitry 28 acquires information regarding which peripheral chip selects to assert and negate from the entry parameters portion 54 in the first entry of queue0 (i.e. DSE 11). Processing circuitry 28 then provides this information to pin control circuitry 39. Pin control circuitry 39 then generates the peripheral chip select signals. The peripheral chip select signals are provided external to serial communication circuitry 10 by way of bonding pads 41–43. Alternate embodiments of the present invention may provide more, fewer, or no peripheral chip selects signals. The peripheral chip select signals are received and used by the peripheral devices (not shown) to determine if they have been selected to participate in the next serial communication with serial communication circuitry 10.

Pin control circuitry 39 is capable of allowing timer 44 to share the usage of bonding pads 41–43 with serial communication circuitry 10. In one embodiment of the present invention, CPU 61 determines the usage of bonding pads 41–43 by programming source select circuitry 46. Source select circuitry 46 can be modified even while serial communication circuitry 10 is enabled and performing serial transfers. For example, timer 44 can be selected as the source for outputting signals by way of bonding pad 41, and serial communication circuitry 10 can be selected to use bonding pads 42 and 43.

In one embodiment of the present invention, pin control circuitry 39 is included as part of the programmer's model of serial communication circuitry 10. In an alternate embodiment of the present invention, pin control circuitry 39 is included as part of the programmer's model of timer 44. And, in yet another embodiment of the present invention, pin control circuitry 39 is not included as part of the programmer's model of either serial communication circuitry 10 or timer 44. Thus, in one embodiment of the present invention, pin control circuitry 39 is used to determine whether bonding pads 38, 41–43, 49, and 51 are utilized by serial communication circuitry 10, timer 44, or other general purpose I/O circuitry (not shown).

Note that unlike the prior art, at least one embodiment of serial communication circuitry 10 does not include pin control circuit 39. By making the pin control circuitry 39 separate from serial communication circuitry 10, CPU 61 does not need to access serial communication circuitry 10 in order to access and utilize the bonding pads controlled by pin control circuitry 39. Thus, bonding pads 38, 41–43, 49, and 51 can be used for other non-serial purposes even when serial communication circuit 10 has been disabled and placed in a low power state where accesses by CPU 61 are disabled. Because timer 44 and serial communication circuitry 10 may not be needed in the same application, they can share the usage of bonding pads 38,41–43,49, and 51. This may free up more bonding pads for other uses, or reduce the total number of bonding pads on an integrated circuit, which in turn reduces the size and thus the cost of the integrated circuit.

Referring to FIG. 2, in one embodiment of the present invention, serial communication circuitry 10 and timer 63 are formed and located on the same semiconductor integrated circuit, while CPU 61 is formed and located on a different semiconductor integrated circuit. In an alternate embodiment of the present invention, all of data processing system 60 is formed and located on one semiconductor integrated circuit. In one embodiment of the present invention, timer 63 is coupled to serial communication circuitry 10 via bus 400. In one embodiment of the present invention, bus 400 includes one or more trigger signals 30 and one or more status conductors.

Referring to FIG. 2 and FIG. 3, CPU 61 is coupled to serial communication circuitry 10 via bus 62, which includes address, data and control conductors. CPU 61 first initializes global protocol element 23, priority execution element 16, enable portion 29, other control/status registers 55, and one or more of queues0–3 (i.e. DSEs 11–14), along with the corresponding protocol element(s) 17–20. Then, CPU 61 provides a trigger signal 30 by way of bus 62 to the trigger input portion 27 (see FIG. 3), which will initiate one or more serial transfers, if all the necessary conditions have been met. Note that in some embodiments of the present invention, timer 63 is also capable of providing one or more trigger signals 30 to trigger input portion 27. After sending a trigger signal 30, CPU 61 and/or timer 44 can return to the processing of other tasks, and serial communication circuitry 10 will perform the requested serial transfer(s).

In one embodiment of the present invention, when the serial transfer(s) are completed by serial communication circuitry 10, processing circuitry 28 asserts one or more status flags (i.e. storage circuits) in other control/status registers 55. The assertion of an appropriate status flag may cause serial communication circuitry 10 to provide an interrupt signal to CPU 61 by way of bus 62 in order to indicate that the serial transfer(s) have been completed (see QSPIM Interrupt Request Configuration Register 276 illustrated in FIG. 9).

Once the serial transfer(s) have been completed by serial communication circuitry 10, CPU 61 may then retrieve the serially received data from the Receive RAM portion 98 (see FIG. 20) of one or more queues0–3 (i.e. DSEs 11–14). In one embodiment of the present invention, CPU 61 provides control and data information to serial communication circuitry 10 by executing write instructions which make use of bus 62. Similarly, CPU 61 retrieves status and data information from serial communication circuitry 10 by executing read instructions which make use of bus 62.

FIG. 4 and FIG. 5 illustrate, in flow diagram form, an example of the operation of serial communication circuitry 10 in accordance with one embodiment of the present invention. In this particular example, only queue0 (i.e. DSE 11) and queue1 (i.e. DSE 12) are being used. In addition, this particular example illustrates a series of four serial transfers which only use the first two entries in queue0 and queue1 as follows: transfer the first entry in queue0, transfer the first entry in queue1, transfer the second entry in queue0, and transfer the second entry in queue1.

The steps of FIG. 4 and FIG. 5 will now be discussed in more detail. At step 70, global parameters are stored in storage circuits such as global protocol element 23. In one embodiment of the present invention, global protocol element 23 may be implemented as one or more bit fields in one or more user programmable registers. Each of the Digital Storage Elements (DSEs 11–14) use the global parameters. As an example, in one embodiment of the present invention, the global parameters are used to determine: (1) the electrical properties of output integrated circuit pin connections; (2) whether or not serial communication circuitry 10 is in a test mode; (3) whether serial communication circuitry 10 should operate in master mode or slave mode; and (4) the duration of delay after each serial transfer.

At step 71, the first set of per-queue parameters are stored in protocol element 17. In one embodiment of the present invention, each of protocol elements 17–20 may be implemented as one or more bit fields in one or more user programmable registers. Each of the Digital Storage Elements (DSEs 11–14) has a corresponding protocol element for storing a corresponding set of per-queue parameters. The per-queue parameters in protocol element 17 determine selected characteristics of the serial communication protocol that queue0 (i.e. DSE 11) uses to serially transfer data to peripheral devices (not shown).

As an example, in one embodiment of the present invention, the per-queue parameters are used to determine: (1) the serial baud rate; (2) the duration of delay after a serial transfer; (3) the timing of the serial clock signal (SCK); (4) the polarity of the serial clock signal (SCK); (5) the phase shift of the serial clock signal (SCK); and (6) the order of how the bits should be transferred (e.g. least significant bit first, or most significant bit first). The per-queue parameters in protocol element 17 are used when queue0 (i.e. DSE 11) is selected (i.e. triggered) to transfer data.

At step 72, the second set of per-queue parameters are stored in protocol element 18. The per-queue parameters in protocol element 18 determine selected characteristics of the serial communication protocol that queue1 (i.e. DSE 12) uses to serially transfer data to peripheral devices (not shown). In the illustrated embodiment of the present invention, the per-queue parameters which can be programmed for queue1 are the same as the per-queue parameters which can be programmed for queue0. However, in alternate embodiments of the present invention, the per-queue parameters which can be programmed for each queue may vary for each queue, of for each group of queues. The per-queue parameters in protocol element 18 are used when queue1 (i.e. DSE 12) is selected (i.e. triggered) to transfer data.

At step 74, a first priority ordering is selected by writing and storing a logic level "1" into Fairness Option register storage bit (FO) 200 (see FIG. 12) in priority execution element 16.

At step 75, other control parameters are written and stored in the other control/status registers 55. Some of the other control and status parameters determine selected characteristics of serial communication circuitry 10. In one embodiment of the present invention, these other control and status parameters determine; (1) interrupt levels; (2) which integrated circuit bonding pads will be used to provide peripheral chip select signals; (3) when an interrupt signal should be asserted; (4) the size of each queue (i.e. the size of each one of DSEs 11–14); (5) which entries of the DSEs 11–14 should be transferred next; and (6) if a transfer error or a mode error has occurred.

At step 76, the source select circuitry 46 in the pin control circuitry 39 is programmed. The source select circuitry 46 determines how the pin control circuitry 39 will channel the signals from timer 44 and serial communication circuitry 10 to the integrated circuit bonding pads 41, 42, and 43. For example, integrated circuit bonding pads 41 and 42 can be selected to be utilized by serial communication circuitry 10, and integrated circuitry pin 43 can be selected to be utilized by timer 44.

At step 77, the data to be transmitted to peripheral devices and the per-entry parameters are written and stored into at least two entries of queue0 (i.e. DSE 11) and at least two entries of queue1 (i.e. DSE 12).

At step 78, queue0 (i.e. DSE 11) and queue 1 (i.e. DSE 12) are enabled by asserting the storage bits 33 and 35 of enable element 29 (see FIG. 3). Once enabled, either queue0 or queue1 can be triggered and can then initiate one or more serial transfers.

In one embodiment of the present invention, the steps leading up to step 79 are performed by a central processing unit (CPU) 61 (see FIG. 1 and FIG. 2). CPU 61 performed write instructions or data transfer instructions which cause data to be stored into various storage circuits (e.g. registers, memory, latches) located in serial communication circuitry 10. In alternate embodiments of the present invention, the initialization data may be provided to serial communication circuitry 10 in other ways.

At step 79, serial communication circuitry 10 waits for queue0 (i.e. DSE 11) and/or queue1 (i.e. DSE 12) to be triggered. In one embodiment of the present invention, serial communication circuitry 10 is triggered by the assertion of one or more trigger signals 30.

At step 80, it is assumed for purposes of this example that queue0 is triggered first. After queue0 (i.e. DSE 11) is triggered, the serial communication circuitry 10 initiates a first serial transfer under the control of the global parameters stored in global protocol element 23, the per-queue parameters stored in protocol element 17, and the per-entry parameters stored in entry parameters 54. The serial data which is transmitted external to serial communication circuitry 10 is stored in the first entry of queue0 (i.e. data portion 53 of Transmit RAM 99, see FIG. 20).

At step 81, the serial data which is received from external to serial communication circuitry 10 is stored in the first entry of queue0 (i.e. data portion 53 of Receive RAM 98, see FIG. 20).

At step 82, it is assumed for purposes of this example that queue1 is triggered next. After queue1 (i.e. DSE 12) is triggered, the serial communication circuitry 10 initiates a second serial transfer under the control of the global parameters stored in global protocol element 23, the per-queue parameters stored in protocol element 18, and the per-entry parameters stored in entry parameters 59. The serial data which is transmitted external to serial communication circuitry 10 is stored in the first entry of queue1 (i.e. data portion 58 of Transmit RAM 99, see FIG. 20).

At step 83, the serial data which is received from external to serial communication circuitry 10 is stored in the first entry of queue1 (i.e. data portion 58 of Receive RAM 98, see FIG. 20).

At step 84, it is assumed for purposes of this example that queue0 is executed next. The serial communication circuitry 10 initiates a third serial transfer which is under the control of the global parameters stored in global protocol element 23, the per-queue parameters stored in protocol element 17, and the per-entry parameters stored in entry parameters 57. The serial data which is transmitted external to serial communication circuitry 10 is stored in the second entry of queue0 (i.e. data portion 56 of Transmit RAM 99, see FIG. 20).

At step 85, the serial data which is received from external to serial communication circuitry 10 is stored in the second entry of queue0 (i.e. data portion 56 of Receive RAM 98, see FIG. 20).

At step 86, it is assumed for purposes of this example that queue1 is executed next. The serial communication circuitry 10 initiates a fourth serial transfer which is under the control of the global parameters stored in global protocol element 23, the per-queue parameters stored in protocol element 18, and the per-entry parameters stored in entry parameters 69. The serial data which is transmitted external to serial communication circuitry 10 is stored in the second entry of queue1 (i.e. data portion 68 of Transmit RAM 99, see FIG. 20).

At step 87, the serial data which is received from external to serial communication circuitry 10 is stored in the second entry of queue1 (i.e. data portion 68 of Receive RAM 98, see FIG. 20).

As long as queue0 and queue1 remain enabled, and any other necessary conditions are met, additional assertions of one or more trigger signals 30 for either queue0 or queue1 will cause additional serial transfers to be initiated. Note that queue2 (i.e. DSE 13) and/or queue3 (i.e. DSE 14) may be properly initialized, enabled, and used at any time.

The Fairness Option register storage bit (FO) 200 (see FIG. 12) determines which of queue0, queue1, queue2, and queue3 has priority and will execute next. Note that a different queue priority ordering can be selected in step 74 by writing and storing a logic level "0" into FO bit 200. When FO bit 200 is a logic level "0", instead of transferring data alternately from entries in queue0 and queue1, the serial communication circuitry 10 will transfer all entries in queue0 (i.e. DSE 11) before initiating transfers of data from queue1 (i.e. DSE 12). Thus, when FO bit 200 is a logic level "0", queue0 is first highest priority, queue1 is second highest priority, queue2 is third highest priority, and queue3 is lowest priority.

FIGS. 6–19 illustrate, for one embodiment of the present invention, the user programmable registers and the associated register bit fields which are used in serial communication circuitry 10.

Referring to FIG. 6, the QSPIM Input Event Configuration Register 270 includes Input Trigger Select bits (ITSn) 101, 105, 109, and 113. Note that the "n" after the bit field name "ITS" indicates that each queue 11–14 has its own ITS bits. The ITSn bits are used to select the source of the trigger signal 30 (see FIG. 3) which is used to activate queue "n". The source of trigger signal 30 can be one of two buses, namely the pin bus or the status bus of timer 63. In alternate embodiments of the present invention, more or other sources of one or more trigger signals 30 may be used.

Still referring to FIG. 6, the QSPIM Input Event Configuration Register 270 also includes Input Event Edge Select bits (IEn) 103, 107, 111, and 115. The IEn bits select which transition of trigger signal 30 (i.e. positive edge, low-to-high transition; negative edge, high-to-low transition), if any, constitutes a triggering event which is used to activate queue "n".

Referring to FIG. 7, the QSPIM Pin Configuration Register 272 includes Pin Assignment bits (PA) 117–126. The PA bits 117–126 are used to select which integrated circuit bonding pads are assigned to the serial communication circuitry 10, and which integrated circuit bonding pads function as general-purpose inputs and general purpose outputs. In one embodiment of the present invention, there are ten integrated circuit bonding pads controlled by the PA bits 117–126, five of which are illustrated in FIG. 3, namely integrated circuit bonding pads 41–43, 49, and 51. Operation of the serial communication circuitry 10 does not affect the integrated circuit bonding pads 10 which are assigned and function as general-purpose inputs or outputs.

Note that in one embodiment of the present invention, the PA bits 117–126 do not affect the serial clock bonding pad 38. In this particular embodiment, the serial clock bonding pad 38 is automatically assigned to and controlled by the serial communication circuitry 10 whenever the serial communication circuitry 10 is enabled, and the serial clock bonding pad 38 is automatically assigned to and functions as a general-purpose input or output whenever the serial communication circuitry 10 is not enabled.

Still referring to FIG. 7, the QSPIM Pin Configuration Register 272 also includes Output Event Enable bits (OEE) 128–135. The OEE bits 128–135 are used to enable or disable the transfer of information from the PCS bits 354–361 (see FIG. 21) to the peripheral chip select bonding pads (e.g. bonding pads 41–43 in FIG. 3). Thus, the OEE bits 128–135 enable or disable the driving of the peripheral chip select bonding pads. The logic values which can be driven as outputs at the peripheral chip select bonding pads are stored in the PCS bits 354–361 in Command RAM 97.

Referring to FIG. 8, the QSPIM Pin Configuration Register 274 includes Port Data bits (PD) 137–147 and Data Direction register storage bits (DD) 149–159. Each one of PD bits 137–147 is used to store either the input value or the output value from the corresponding bonding pad. The PD bits 137–147 are used in the same manner as prior art port data register bits. Each one of the DD bits 149–159 is used to determine whether the corresponding bonding pad is being used as an input or an output. The DD bits 149–159 are used in the same manner as prior art port data direction register bits.

Referring to FIG. 9, the QSPIM Interrupt Request Configuration Register 276 includes Interrupt Level bits (ILEn) 162, 165, 168, and 171, as well as Queue End Interrupt Enable bits (QEIEn) 161, 164, 167, and 170. The QEIEn bits 161, 164, 167, and 170 allow the user to program serial communication circuitry 10 to generate an interrupt to CPU 61 if the end of a queue is reached. Note that the QFIN bits 255–258 (see FIG. 19) indicate whether or not the end of each queue has been reached. As an example, if the QEIE0 bit 161 is a logic level "1", then when the QFIN bit 255 is asserted to a logic level "1", serial communication circuitry 10 provides an interrupt signal to CPU 61. The ILEn bits 162, 165, 168, and 171 determine the interrupt level for the interrupts generated by the corresponding queue "n".

Referring to FIG. 10, the QSPIM Interrupt Request Configuration Register 278 includes General Purpose Interrupt Level bits (GPIL) 175, Interrupt Enable bit (IEN) 174, and Queue Trigger Collision Interrupt Enable bit (TCIE) 173. The TCIE bit 173 allows the user to program whether or not serial communication circuitry 10 generates and provides an interrupt to CPU 61 if a trigger collision is detected. A trigger collision occurs when one or more trigger signals 30 (see FIG. 3) are asserted at the same time. In addition, a trigger collision occurs when a trigger for queue "n" is received before queue "n" has finished executing. Note that the TCn bits 251–254 (see FIG. 19) indicate whether or not a trigger collision has been detected for the corresponding queue.

Still referring to FIG. 10, the IEN bit 174 allows the user to program whether or not serial communication circuitry 10 generates and provides an interrupt to CPU 61 if a mode error, transfer error, or halt acknowledge is detected (i.e. if any one of the following three status flags is asserted: MOS bit 249, TES bit 250, or HAS bit 248 in FIG. 19). The GPIL bits 175 provide the interrupt level for general-purpose interrupt sources. In one embodiment of the present invention, these general-purpose interrupt sources are mode error (MOS bit 249), transfer error (TES bit 250), halt acknowledge (HAS bit 248), and trigger collision (TC bits 251–254) (see FIG. 19).

Referring to FIG. 11, the QSPIM Queue Pointer Configuration Register 280 includes the Queue End Pointer bits (QENDn) 179, 181, 183, and 185. Each set of QENDn bits 179, 181, 183, and 185 contains the end queue pointer for the corresponding queue. Each set of QENDn bits 179, 181, 183, and 185 is a 6-bit binary address used to point to the last entry of queue n. Note that in one embodiment of the present invention, queue(n+1) begins with the next entry after QENDn. Also, in one embodiment of the present invention, queue0 always begins at address %000000.

In one embodiment of the present invention, the user is responsible for ensuring, in software, that overlaps between the queues do not corrupt data. Since there are no pre-assigned address locations for each of the four queues, each of the four queues can be programmed to occupy one through sixty-four entries. With such flexibility, the user needs to be aware that if more than one queue is enabled, there is a possibility of having overlapping queues. For example, if the end of queue pointers for queue 0 (QEND0 bits 179) and queue1 (QEND1 bits 181) are programmed so that the address of QEND1 is a lower address than the address of QEND0, data in the overlapped portion of queue0 and queue1 may be corrupted.

Referring to FIG. 12, the QSPIM Queue Control Register 282 includes CPU Trigger bits (CTn) 187–190, Queue Enable bits (QENn) 191–194, Queue Wrap Enable bits (QWEn) 195–198, Fairness Option bit (FO) 200, and Halt Queue Execution bit (HALT) 201. If one of the CTn bits 187–190 is a logic level "1", then one or more trigger signals 30 provided by CPU 61 to serial communication circuitry 10 can act as a software trigger by activating queue n.

The FO bit 200 selects between different queue priority ordering schemes for the situation in which multiple queues are active. If the fairness option is selected, multiple queue execution is accomplished in a "round-robin" fashion. If the priority option is selected, each queue has an inherent priority, where queue0 has the highest priority and queue3 has the lowest priority. Alternate embodiments of the present invention may use fewer, more, or different priority schemes.

The Queue Enable bits (QENn) 191–194 allow serial communication circuitry 10 to enable one or more of the four queues. When QENn is a logic level "1", queue "n" is enabled so that queue "n" can perform serial transfers when the proper trigger signal 30 is received. If any queue is enabled, serial communication circuitry 10 uses all of the integrated circuit bonding pads that the Pin Assignment bits (PA) 117–126 (see FIG. 7) have allocated for QSPIM integrated circuit pins.

If serial communication circuitry 10 is in SPI master mode, enabling a queue causes serial communication circuitry 10 to monitor input event triggers (i.e. trigger signals 30) for that queue. Once an enabled queue is activated by an input event trigger, it commences serial transfers. If serial communication circuitry 10 is in SPI slave mode, enabling a queue causes serial communication circuitry 10 to begin monitoring the PCS0/SS pin in order to respond to external initiation of a serial transfer.

When serial communication circuitry 10 finishes executing queue "n", it clears the Queue Active bit (QAn) 262–265 of queue "n" (see FIG. 19). A queue completes its execution when one of the following conditions is met: (1) the Pause Enable bit (PE) 350 for the just completed serial transfer is asserted (the PE bit 350 is a per-entry parameter stored in Command RAM 97, see FIG. 21); or (2) the last entry of a queue is reached and the Queue Wrap Enable bit (QWEn) 195–198 is not asserted; or (3) the Queue Pointer (QPTRn) 240, 242, 244, or 246 for queue "n" equals the Queue End Pointer (QENDn) 179, 181, 183, or 185 for queue "n", and the Queue Wrap Enable bit (QWEn) 195–198 for queue "n" is not asserted.

If all QENn bits 191–194 are negated, then serial communication circuitry 10 is disabled. If serial communication circuitry 10 is disabled, eleven out of the twelve integrated circuit pins (namely MISO, MOSI, PCS7-PCS0/SS, and SCK) are regarded as general purpose I/O, regardless of the value of the PA bits 117–126 (see FIG. 7). Even when serial communication circuitry 10 is disabled, the CPU 61 still has read and write assess to all of the registers and RAM in the programmer's model for serial communication circuitry 10 (see FIG. 22).

If the QENn bits 191–194 for queue "n" are negated while queue "n" is executing, serial communication circuitry 10 immediately disables queue "n", clears the QAn bit 262–265) for queue "n", leaves the PCS integrated circuit pins in their current logic state, and transfers execution to the next queue that is active (i.e. both enabled and triggered). If no other queues are enabled, then serial communication circuitry 10 is disabled. However, this method of disabling a queue or the entire serial communication circuitry 10 is not recommended because loss of data from a current serial transfer may result.

The Queue Wrap Enable bits (QWEn) 195–198 enable the wraparound option for queue "n". When the wraparound option is enabled, serial communication circuitry 10 cycles through queue "n" continuously by wrapping from the end of the queue back to the beginning of the queue. Serial communication circuitry 10 will continuously re-execute queue "n" until the HALT bit 201 is asserted, or until the QENn bit 191–194 for queue "n" is negated, or until queue "n" is paused (by the assertion of a pause bit PE 350 in Command RAM 97, see FIG. 21). If QWEn bit 195–198 for queue "n" is negated, execution will stop when the end of queue "n" is reached.

Regardless of whether or not the wraparound option is enabled, whenever execution of the last entry of queue "n" is completed, the End of Queue flag for queue "n" (QFINn) 255–258 (see FIG. 19) is asserted. In wraparound operation, CPU 61 may modify the contents of Transmit RAM 99 and Command RAM 97 (see FIG. 20). Thus, a queue "n" that is executing with the wraparound option enabled can be paused by asserting the pause bit PE 350 in one of the Command RAM 97 entries for queue "n".

Referring to FIG. 13, the QSPIM Communication Control Register 284 includes Loop Mode For Test bit (LT) 204, Master/Slave Mode bit (MAS) 205, Wired-OR bit (WO) 206, and Default Coefficient For Delay After Transfer bits (DCDT) 209.

LT bit 204 enables or disables the feedback path for serializer 50 for the purpose of testing serial communication circuitry 10. If LT bit 204 is a logic level "1", serial communication circuitry 10 routes data from the output of serializer 50 back into the input of serializer 50. If LT bit 204 is a logic level "0", serial communication circuitry 10 operates in the standard manner by allowing received data to be input to serializer 50. LT bit 204 does not affect the integrated circuit pins coupled to serial communication circuitry 10.

MAS bit 205 is used to configure serial communication circuitry 10 for either SPI master mode operation or SPI slave mode operation. In master mode, serial communication circuitry 10 can initiate serial transfers; however, in slave mode serial communication circuitry 10 will respond to externally initiated serial transfers.

The WO bit 206 allows the integrated circuit pins to be configured as wire-ORed outputs, regardless of whether the pins are used as general-purpose outputs or as outputs for serial communication circuitry 10. The affected integrated circuit pins must be designated as outputs by the DD bits 149–159 (see FIG. 8). The WO bit 206 affects the integrated circuit pins regardless of whether serial communication circuitry 10 is enabled or disabled.

FIGS. 14–17 illustrate one embodiment of the QSPIM Communication Control Registers (for Queue n) 286, 288, 290, and 292. Each of the four queues has a corresponding QSPIM Communication Control Register 286, 288, 290, and 292 for storing per-queue parameters. Each Communication Control Register 286, 288, 290, and 292 includes Coefficient For Serial Clock Baud Rate bits (BAUDn), Coefficient For Delay After Transfer bits (CDTn), Coefficient For Delay Before Serial Clock bits (DSCn), Clock Polarity bit (CPOLn), Clock Phase bit (CPHAn), and Least Significant Bit First bit (LSBFn).

The Coefficient For Serial Clock Baud Rate (BAUDn) bits 211, 218, 225, and 232 determine the baud rate for queue "n". The BAUDn bits are used to determine the Serial Clock Baud Rate for SCK, which is derived from the system clock by the following relationship: Serial Clock Baud Rate for queue "n" equals System Clock Rate divided by BAUDn. In an alternate embodiment of the present invention, a programmable prescale value may be used in determining the Serial Clock Baud Rate. In one embodiment of the present invention, the maximum Serial Clock Baud Rate equals the System Clock Rate divided by four.

The Coefficient For Delay After Transfer bits (CDTn) 217, 224, 231, and 238 determine, for queue "n", the delay time after each serial transfer for which the DT bit 352 is asserted in Command RAM 97 (see FIG. 21). The delay time is derived from the system clock by the following relationship: Delay After Transfer equals System Clock Period multiplied by CDTn. In an alternate embodiment of the present invention, a programmable prescale value may be used in determining the length of the Delay After Transfer.

The Coefficient For Delay Before Serial Clock bits (DSCn) 212, 219, 226, and 233 determine, for queue "n", the delay from the time peripheral chip select(s) is/are asserted to the time SCK goes active for each serial transfer is queue "n". The delay time is derived from the system clock according to the following relationship: Delay Time equals System Clock Period multiplied by DSCn. In an alternate embodiment of the present invention, a programmable prescale value may be used in determining the length of the Delay Time.

The Clock Polarity bits (CPOLn) 215,222, 229, and 236 determined the inactive state of serial clock (SCK) for queue "n". The CPOLn bit selects the inactive state of the serial clock (SCK) for queue "n".

The Clock Phase bits (CPHAn) 216, 223, 230, and 237 determine how the rising and falling transitions of the serial clock (SCK) are related to the transmitting and latching of data on the MISO and MOSI integrated circuit pins. The CPHAn bit selects the clock phase for queue "n". If the CPHAn bit 216, 223, 230, and 237 and the CPOL bits 215, 222, 229, and 236 have different values between queues, the serial clock (SCK) may be in an undefined state when it makes the transition from the previous queue's serial clock (as defined by the CPHAn bits and the CPOLn bits) to the next queue's serial clock (as defined by the CPHA(n+1) bits and the CPOL(n+1) bits). It is up to the programmer to ensure that all devices are deselected and that the proper delays are programmed when the serial clock (SCK) transition occurs between queues.

The Least Significant Bit First bits (LSBFn) 214, 221, 228, and 235 determine, for queue "n", whether the most significant bit or least significant bit of a data value is transferred first. When LSBFn bit is a logic level "1", the least significant bit of the transfer data value is transferred first, and the least significant bit of the receive data value is received first. For a transfer data value, the least significant bit is determined by the least significant bit location in the Transmit RAM 99 (see FIG. 20). For a receive data value, the least significant bit is determined by the value of the LBSFn bit and the bit ordering in which the bit was received. The least significant bit of the received value is then stored in the least significant bit location in the Receive RAM 98 (see FIG. 20).

Referring to FIG. 18, the QSPIM Queue Pointer Register 294 includes the Queue Pointer (QPTRn) bits 240, 242, 244, and 246. Each queue "n" has its own QPTRn bits which store the present pointer value for queue "n". In one embodiment of the present invention, each set of QPTRn bits stores an address which points to the queue entry that will be executed next in queue "n". A queue pointer is capable of pointing to one of sixty-four queue entries in queue "n". When the serial communication circuitry 10 is disabled, frozen, or halted, CPU 61 may change the value of any set of QPTRn bits 240, 242, 244, and 246. Thus, when the serial communication circuitry 10 returns to execution, it will begin executing at the entry pointed to by the newly modified pointer value stored in QPTRn. If the value of QPTRn is changed while queue "n" is executing or pending execution, then the data for the entry in the Received RAM 98 (see FIG. 20) that was pointed to by QPTRn prior to the modification may be corrupted.

Referring to FIG. 19, the QSPIM Queue Status Register 296 includes Halt Acknowledge Status (HAS) bit 248, Mode Error Status (MOS) bit 249, Transfer Error Status (TES) bit 250, Trigger Collision (TCn) bits 251–254, End Of Queue Flags For Queue "n" (QFINn) bits 255–258, Executing Queue (EXQ) bits 260, and Queue Active (QAn) bits 262–265. Selected status bits in the QSPIM Queue Status Register 296 may be cleared by performing the following steps in the following order: (1) reading the status bit in its asserted state; (2) writing a logical "0" to the status bit. Selected status bits in the QSPIM Queue Status Register 296 are read-only status bits.

The Halt Acknowledge Status (HAS) bit 248 is asserted by serial communication circuitry 10 when it has come to an orderly halt. Note that CPU 61 halts serial communication circuitry 10 by asserting the Halt Queue Execution (HALT) bit 201 (see FIG. 12). If the Interrupt Enable (IEN) bit 174 (see FIG. 10) is asserted, serial communication circuitry 10 provides an interrupt to CPU 61.

The Mode Error Status (MOS) bit 249 is asserted by serial communication circuitry 10 when all of the following conditions have occurred: (1) serial communication circuitry 10 is in SPI master mode (i.e. MAS bit 205 in FIG. 13 is a logic level "1"); (2) the slave select integrated circuit pin (PCS0/SS) is configured as an input by the DD bits 149–159 (see FIG. 8) and is assigned to the serial communication circuitry 10 by the PA bits 117–126 (see FIG. 7); (3) at least one queue is enabled, i.e. at least one QENn bit 191–194 is a logic level "1" (see FIG. 12); and (4) the slave select integrated circuit pin (PCS0/SS) is pulled low by an external peripheral device. This low input to the slave select integrated circuit pin (PCS0/SS) indicates that a multi-master system conflict may exist, that another peripheral is requesting to become the master, or simply that the hardware is incorrectly affecting the PCS0/SS integrated circuit pin.

If the Interrupt Enable (IEN) bit 174 is a logic level "1" when the Mode Error Status (MOS) bit 249 is asserted, serial communication circuitry 10 generates and provides an interrupt to CPU 61. Whenever MOS bit 249 is asserted during execution of queue "n", all of the QENn bits 191–194 (see FIG. 12) are negated to disable all of the queues.

The Transfer Error Status (TES) bit 250 is asserted by serial communication circuitry 10 whenever serial communication circuitry 10 is in SPI slave mode (i.e. MAS bit 205 in FIG. 13 is a logic level "0") and serial communication circuitry 10 detects that an incorrect number of clocks have been received during a serial transfer. The TES bit 250 is asserted if any one of the following conditions have been met: (1) serial communication circuitry 10 has received the number of serial bits determined by the BITS 353 field in Command RAM 97 (see FIG. 21), and the CONT bit 351 is a logic level "0", and a serial clock (SCK) pulse is received before the slave select signal (PCS0/SS) is negated; (2) serial communication circuitry 10 has received the number of serial bits determined by the BITS 353 field in Command RAM 97 (see FIG. 21), and the CONT bit 351 is a logic level "1", and the slave select signal (PCS0/SS) is negated; and (3) serial communication circuitry 10 has not yet received the number of serial bits determined by the BITS 353 field in Command RAM 97 (see FIG. 21), and the slave select signal (PCS0/SS) is negated.

If the Interrupt Enable (IEN) bit 174 is a logic level "1" when the Transfer Error Status (TES) bit 250 is asserted, serial communication circuitry 10 will generate and provide an interrupt to CPU 61.

The Trigger Collision (TCn) bits 251–254 are used to indicate if another trigger for queue "n" (e.g. trigger signal 30 in FIG. 3) was received before queue "n" had finished executing. Generally, serial communication circuitry 10 should be allotted enough time to finish executing a queue before that same queue is re-triggered. If the trigger occurs too frequently, the TCn bit for the corresponding queue will be asserted. If the Queue Trigger Collision Interrupt Enable (TCIE) bit 173 is a logic level "1" when any one of the Trigger Collision (TCn) bits 251–254 is asserted, serial communication circuitry 10 will generate and provide an interrupt to CPU 61.

The End Of Queue Flags For Queue "n" (QFINn) bits 255–258 indicate whether or not the Queue Pointer of queue "n" (QPTRn bits 240, 242, 244, 246 in FIG. 18) matches the Queue End Pointer of queue "n" (QENDn bits 179, 181, 183, 185 in FIG. 11). If the present pointer value for queue "n" (QPTRn) equals the end queue pointer value for queue "n" (QENDn), then the End Of Queue Flag For Queue "n" (QFINn) is asserted. If the Queue End Interrupt Enable bit (QEIEn) 161,164, 167, 170 for queue "n" is a logic level "1" when any one of the QFINn bits 255–258 is asserted, serial communication circuitry 10 will generate and provide an interrupt to CPU 61 to indicate that the end of a queue has been reached.

The Executing Queue (EXQ) bits 260 are used to indicate which of the four queues is currently executing. In one embodiment of the present invention, the left-most bit of EXQ 260 indicates whether or not any queue is executing.

If the left-most bit of EXQ 260 is a logic level "1", then there is a queue currently executing and the remaining two bits of EXQ 260 represent the number of the queue that is currently executing. If the left-most bit of EXQ 260 is a logic level "0", then there is no queue currently executing and the remaining two bits of EXQ 260 represent the number of the queue that was executed last, assuming that at least one serial transfer has been executed. Note that when all queues are disabled, the left-most bit of EXQ 260 is a logic level "0".

The Queue Active (QAn) bits 262–265 are used to indicate which queues are active. There is one Queue Active (QAn) bit for each queue. If an enabled queue is triggered, it will become active. A queue becomes inactive when that queue is finished executing or when that queue is disabled. In one embodiment of the present invention, the QAn bits are read-only status bits.

Referring to FIG. 20 and FIG. 3, each multi-entry digital storage element (DSE) 11–14 has a Receive RAM portion for storing received data, a Transmit RAM portion for storing transmit data, and a Command RAM portion for storing per-entry parameters. Receive RAM 98 includes the Receive RAM portion for all four DSEs 11–14; Transmit RAM 99 includes the Transmit RAM portion for all four DSEs 11–14; and Command RAM 97 includes the Command RAM portion for all four DSEs 11–14.

If serial communication circuitry 10 is in SPI master mode and queue "n" is enabled, active, and executing, the QPTRn bits (see FIG. 18) point to the entry "x" in queue "n" which is to be executed next. This entry "x" in queue "n" has a Receive RAM portion for storing received data, a Transmit RAM portion for storing transmit data, and a Command RAM portion for storing per-entry parameters. When this entry "x" is executed, the transmit data value stored in the Transmit RAM portion is transferred to serializer 50. Serializer 50 serially transmits the data on the Master Out/Slave In (MOSI) integrated circuit pin, while at the same time serializer 50 serially receives incoming data on the Master In/Slave OUT (MISO) integrated circuit pin. The received data value is then transferred to the Receive RAM portion of entry "x". The Command RAM portion of entry "x" stores per-entry parameters which are used to control or affect the transfer and reception of data to and from entry "x".

If serial communication circuitry 10 is in SPI slave mode, a serial transfer is initiated by the assertion of the slave select integrated circuit pin (PCS0/SS). In SPI slave mode, serializer 50 receives data on the Master Out/Slave In (MOSI) integrated circuit pin and transmits data on the Master In/Slave Out (MISO) integrated circuit pin at the same time.

CPU 61 performs write accesses to Transmit RAM 99 and Command RAM 97 in order to store the proper values. CPU 61 performs read accesses to Receive RAM 98 in order to retrieve the data values received from peripherals devices coupled to the SPI integrated circuit pins.

FIG. 21 illustrates the per-entry parameters which are stored in the Command RAM 97 portion of each queue entry. In one embodiment of the present invention, the per-entry parameters include Peripheral Chip Select storage bits (PCS0–7) 354–361, Delay after Transfer storage bit (DT) 352, Number Of Bits storage bits (BITS) 353, Continue storage bit (CONT) 351, and Pause Enable storage bit (PE) 350. In SPI slave mode, only BITS 353 are used in order to determine how many bits of data are to be exchanged with a peripheral device. However, in SPI master mode, all of the per-entry parameters in an entry are used to control operation just before, during, and just after the serial transfer for that entry.

The Peripheral Chip Select storage bits (PCS0–7) 354–361 can be used to select one of eight external devices for the next serial transfer. These eight peripheral chip select bits (PCS 354–361) can also be decoded and used to select one of 255 external devices for the next serial transfer. The logic values stored in the PCS bits 354–361 in Command RAM 97 can be driven as outputs at the peripheral chip select bonding pads (e.g. bonding pads 41–43 in FIG. 3) and used as chip select signals to select a peripheral device. If a peripheral chip select pin is programmed as general purpose I/O (see Pin Assignment bits 117–126 in FIG. 7), then the corresponding peripheral chip select bit (PCS 354–361) in Command RAM 97 is not used.

The DT bit 352 allows serial communication circuitry 10 to interface with peripherals having different latency requirements. On a per-entry basis, the Delay after Transfer storage bit (DT) 352 controls the insertion of a delay after each queue entry serial transfer has completed. If the DT bit 352 is asserted, the amount of delay inserted after the serial transfer is specified on a per-queue basis by the CDTn bits 217, 224, 231, 238 (see FIGS. 14–17). If the DT bit 352 is negated, the amount of delay inserted after the serial transfer is specified on a global basis by the DCDT bits 209 (see FIG. 13).

In SPI master mode, the Number Of Bits storage bits (BITS) 353 indicate the number of bits to be serially transferred; and in SPI slave mode, the Number Of Bits storage bits (BITS) 353 indicate the number of bits to be received.

The Continue storage bit (CONT) 351 determines whether the peripheral chip select(s) remain asserted or are negated after completing execution of a queue entry serial transfer. Some peripheral devices must be deselected between every queue entry serial transfer. Other peripheral devices must remain selected between multiple sequential queue entry serial transfers. When serial communication circuitry 10 is using the Priority Option to determine the priority scheme between multiple queues (the FO bit 200 is a logic level "0", see FIG. 12), serial communication circuitry 10 will not transfer execution to a higher priority queue until serial transfers for all sequential entries which have the CONT bit 351 asserted have been completed.

In slave mode, the CONT bit 351 may be used in conjunction with the BITS storage bits 353 to detect if an incorrect number of clocks have been received during a serial transfer. For example, if thirty-five bits are to be transferred into the first two entries of queue0 (i.e. DSE 11), the programmer (by way of CPU 61) stores the following values into the first Command RAM entry 54: CONT bit 351 equals %1, and BITS bits 353 equal %00000. The programmer also stores the following values into the second Command RAM entry 57: CONT bit 351 equals %0, and BITS bits 353 equal %00011. Serial communication circuitry 10 thus expects exactly 35 serial clock periods to be received before the signal on the slave select integrated circuit pin (PCS0/SS) is negated. If fewer or more than 35 serial clock periods are received before the signal on the slave select integrated circuit pin (PCS0/SS) is negated, a transfer error has occurred and the Transfer Error Status (TES) bit 250 will be asserted (see FIG. 19).

In one embodiment of the present invention, if the CONT bit 351 is a logic level "0", then the output logic state driven on the peripheral chip select(s) after a queue entry serial transfer has been completed is determined by the PD bits 137–147 (see FIG. 8). And if the CONT bit 351 is a logic level "1", then the peripheral chip select(s) continue to be driven by the values stored in the PCS bits 354–361 (see FIG. 21) after the queue entry serial transfer has been completed.

The Pause Enable storage bit (PE) 350 determines whether or not serial communication circuitry 10 will pause execution of the queue after completing execution of the entry which contains the asserted pause bit. Serial communication circuitry 10 will resume execution of the queue, starting with the next entry, when the queue is reactivated by a new trigger.

In one embodiment of the present invention, if the PE bit 350 in an entry is a logic level "0", then there is no pause after execution of this entry. But if the PE bit 350 in an entry is a logic level "1", then there is a pause after execution of this entry.

FIG. 22 illustrates one possible memory map and programmer's model for serial communication circuitry 10. The "X" in the upper bits of the addresses indicates that this memory map for serial communication circuitry 10 may be located anywhere convenient in a larger, global memory map. In one embodiment of the present invention, the first address location ($X000) is reserved for a Bus Interface Unit (not shown) which is used to interface serial communication circuitry 10 to bus 93 (see FIG. 1). Serial communication circuitry 10 can be coupled to different Bus Interface Units.

All but the "Reserved" portions of the memory map illustrated in FIG. 22 are capable of being read and written by CPU 61. In one embodiment of the present invention, address location $X03C is reserved for a Test Register which is used solely for testing purposes. Registers 270, 272, 274, 276, 278, 280, 282, 284, 286, 288, 290, 292, 294, and 296 are illustrated in more detail in FIGS. 6–19. Receive RAM 98, Transmit RAM 99, and Command RAM 97 are illustrated in more detail in FIG. 20.

In summation, the above specification describes a queued serial interface for data communications between components of a data processing system. In one embodiment of the present invention, serial communication circuitry 10 has multiple queues. Serial transfers from these multiple queues are carried out under the control of global parameters, per-queue parameters, and per-entry parameters. Because serial communication circuitry 10 has multiple queues which use global, per-queue, and per-entry parameters, less intervention is required by a central processing unit (CPU) 61.

Using the present invention, CPU 61 can initialize a plurality of queues so that serial communication circuitry 10 can communicate with a wide variety of peripheral devices. Each queue can be programmed to have a different set of per-queue communication protocol parameters. In addition, each entry within a queue can be programmed to have a different set of per-entry parameters.

In addition, the present invention allows serial communication circuitry 10 to perform serial transfers in response to the assertion of a trigger signal from a timer 63, a CPU 61, or from external to the integrated circuit on which serial communication circuitry 10 is located. Thus data transfers can be more precisely related to a particular timing signal or set of timing signals.

While the present invention has been illustrated and described with reference to specific embodiments, further modifications and improvements will occur to those skilled in the art. For example, various circuits could be used to implement any of the blocks illustrated in the FIGS. 1–3 and 6–22. A different bus structure may be used in FIGS. 1–2. Other circuitry and logic (not shown) may be included in FIGS. 1–3.

It is to be understood, therefore, that this invention is not limited to the particular forms illustrated and that it is intended in the appended claims to cover all modifications that do not depart from the spirit and scope of this invention.

We claim:

1. A serial communication processor, comprising:

a plurality of multi-entry digital storage elements, wherein each entry of each multi-entry digital storage element of the plurality of multi-entry digital storage elements includes a data portion and an entry parameter portion, and wherein the data portion includes a receive data portion and a transmit data portion;

a global protocol element that stores global parameters for the plurality of multi-entry digital storage elements;

a plurality of protocol circuits, wherein a corresponding protocol circuit of the plurality of protocol circuits stores parameters for a corresponding multi-entry digital storage element of the plurality of multi-entry digital storage elements; and serial transfer control logic, coupled to the plurality of multi-entry digital storage elements, to the global protocol element, and to the plurality of protocol circuits, wherein the serial transfer control logic selects one of the plurality of multi-entry digital storage elements and the corresponding protocol circuit of the one of the plurality of multi-entry digital storage elements and executes a serial data transfer with the one of the plurality of multi-entry digital storage elements based on the parameters stored in the corresponding protocol circuit, the global parameters, and entry parameters stored in the entry parameter portion.

2. A serial communication processor as in claim 1, further comprising:

a status element, coupled to the serial transfer control logic, the status element storing status information for each of the plurality of multi-entry digital storage elements.

3. A serial communication processor as in claim 1, further comprising:

a condition element, coupled to the serial transfer control logic, the condition element storing condition information for each of the plurality of multi-entry digital storage elements.

4. A serial communication processor as in claim 3, wherein the condition element comprises:

an enablement portion;

an active portion; and an executing portion.

5. A serial communication processor as in claim 1, wherein the serial transfer control logic comprises:

a trigger input portion that receives a trigger signal which indicates a first request for the serial data transfer.

6. A serial communication processor as in claim 5, further comprising:

a condition element, coupled to the serial transfer control logic, the condition element storing condition information for each of the plurality of multi-entry digital storage elements, and the condition element having an enablement portion, an active portion, and an executing portion.

7. A serial communication processor as in claim 6, wherein the serial transfer control logic further comprises:

a trigger collision element, coupled to the trigger input portion, the trigger collision element indicating that a subsequent request has been received while the first request for the serial data transfer is still pending.

8. A serial communication processor as in claim 6, further comprising:

a priority execution element, coupled to the serial transfer control logic, the priority execution element storing priority information;

wherein selection of the one of the plurality of multi-entry digital storage elements is based on the priority information stored in the priority execution element and the condition information stored in the condition element.

9. A serial communication processor as in claim 1, further comprising:

a first serial data integrated circuit bonding pad, coupled to the plurality of multi-entry digital storage elements;

a second serial data integrated circuit bonding pad, coupled to the plurality of multi-entry digital storage elements;

serial clock generation circuitry, coupled to the serial transfer control logic; and a serial clock integrated circuit bonding pad, coupled to the serial clock generation circuitry.

10. A serial communication processor as in claim 9, further comprising:

a plurality of multi-purpose integrated circuit bonding pads; and pin control circuitry, coupled to the plurality of multi-purpose integrated circuit bonding pads.

11. A serial communication processor as in claim 10, wherein the pin control circuitry comprises:

a timer input;

a serial communication input; and a source select element for storing a source select value; wherein the pin control circuitry selectively couples one of the timer input and the serial communication input to a first one of the multi-purpose integrated circuit bonding pads in response to the source select value.

12. A serial communication processor as in claim 10, wherein the pin control circuitry detects that the serial data transfer has been initiated, and in response, provides a serial data transfer initiated signal to a timer.

13. A data processing system, comprising:

serial communication circuitry;

wherein the serial communication circuitry comprises:

a plurality of multi-entry digital storage elements, wherein each entry of each multi-entry digital storage element of the plurality of multi-entry digital storage elements includes a data portion and an entry parameter portion, and wherein the data portion includes a receive data portion and a transmit data portion;

a global protocol element that stores global parameters for the plurality of multi-entry digital storage elements;

a plurality of protocol circuits, wherein a corresponding protocol circuit of the plurality of protocol circuits stores parameters for a corresponding multi-entry digital storage element of the plurality of multi-entry digital storage elements; and serial transfer control logic, coupled to the plurality of multi-entry digital storage elements, to the global protocol element, and to the plurality of protocol circuits, wherein the serial transfer control logic selects one of the plurality of multi-entry digital storage elements and the corresponding protocol circuit of the one of the plurality of multi-entry digital storage elements and executes a serial data transfer with the one of the plurality of multi-entry digital storage elements based on the parameters stored in the corresponding protocol circuit, the global parameters, and entry parameters stored in the entry parameter portion.

a first serial data integrated circuit bonding pad, coupled to the plurality of multi-entry digital storage elements;

a second serial data integrated circuit bonding pad, coupled to the plurality of multi-entry digital storage elements; and a serial clock integrated circuit bonding pad, coupled to the serial transfer control logic.

14. A data processing system as in claim 13, further comprising:

a central processing unit; and a bus, coupled to the serial communication circuitry and to the central processing unit, the bus transferring data information, address information, and control information.

15. A data processing system as in claim 14, wherein the data processing system is located on a same integrated circuit.

16. A data processing system as in claim 13, further comprising:

timer circuitry, coupled to the serial communication circuitry.

17. A data processing system as in claim 16, wherein the data processing system is located on a same integrated circuit.

18. A method for processing serial communications, the method comprising the steps of:

storing global parameters in a first protocol storage circuit;

storing a first set of parameters in a second protocol storage circuit;

storing a second set of parameters in a third protocol storage circuit;

storing a third set of parameters in a first entry in a first multi-entry digital storage element;

storing a first receive data value in the first entry in the first multi-entry digital storage element;

storing a first transmit data value in the first entry in the first multi-entry digital storage element;

storing a fourth set of parameters in a first entry in a second multi-entry digital storage element;

storing a second receive data value in the first entry in the second multi-entry digital storage element;

storing a second transmit data value in the first entry in the second multi-entry digital storage element;

initiating a first serial transfer to transfer the first receive data value and the first transmit data value;

controlling the first serial transfer using the global parameters, the first set of parameters, and the third set of parameters;

initiating a second serial transfer to transfer the second receive data value and the second transmit data value; and controlling the second serial transfer using the global parameters, the second set of parameters, and the fourth set of parameters.

19. A method as in claim 18, wherein said step of initiating a first serial transfer further comprises the step of:

providing a chip select signal.

20. A method as in claim 18, further comprising the steps of:

enabling the first multi-entry digital storage element; and enabling the second multi-entry digital storage element.

21. A method as in claim 18, further comprising the step of:

selecting a first priority ordering.

22. A method as in claim 21, further comprising the steps of:

initiating a third serial transfer to transfer data with the first multi-entry digital storage element;

initiating a fourth serial transfer to transfer data with the second multi-entry digital storage element;

performing said step of initiating the first serial transfer before said step of initiating the second serial transfer;

performing said step of initiating the second serial transfer before said step of initiating the third serial transfer; and performing said step of initiating the third serial transfer before said step of initiating the fourth serial transfer.

23. A method as in claim 18, further comprising the step of:

selecting a second priority ordering.

24. A method as in claim 23, further comprising the steps of:

initiating a third serial transfer to transfer data with the first multi-entry digital storage element;

initiating a fourth serial transfer to transfer data with the second multi-entry digital storage element; and performing said steps of initiating the first serial transfer and initiating the third serial transfer before performing said steps of initiating the second serial transfer and initiating the fourth serial transfer.

\* \* \* \* \*